United States Patent [19]

Rourke et al.

[11] Patent Number: 5,450,541

[45] Date of Patent: Sep. 12, 1995

[54] METHOD OF APPLYING ELECTRONICALLY STORED LABELS TO A PRINT JOB

[75] Inventors: John L. Rourke, Fairport; Steven M. Rousos, Spencerport, both of N.Y.

[73] Assignee: Xerox Corporation, Stamford, Conn.

[21] Appl. No.: 226,166

[22] Filed: Apr. 12, 1994

Related U.S. Application Data

[63] Continuation-in-part of Ser. No. 628,130, Dec. 14, 1990, Pat. No. 5,309,558.

[51] Int. Cl.⁶ ............................................. G06F 3/153
[52] U.S. Cl. .................................... 395/155; 395/145; 395/117
[58] Field of Search ................. 395/145, 146, 147–149, 395/155, 156, 157, 158, 159, 101, 111, 116, 117

[56] References Cited

U.S. PATENT DOCUMENTS

| | | | |
|---|---|---|---|
| 4,085,445 | 4/1978 | Blevins et al. | 364/900 |
| 4,306,803 | 12/1981 | Donohue et al. | 355/14 C |
| 4,494,862 | 1/1985 | Tanaka | 355/14 C |
| 4,542,378 | 9/1985 | Suganuma et al. | 340/734 |
| 4,674,040 | 6/1987 | Barker et al. | 364/300 |
| 4,920,337 | 4/1990 | Kuo | 340/721 |
| 4,992,827 | 2/1991 | Kobayashi et al. | 355/202 |
| 5,016,048 | 5/1991 | Watanabe | 355/202 |
| 5,091,746 | 2/1992 | Watanabe | 355/202 |

FOREIGN PATENT DOCUMENTS

374892A2 6/1990 European Pat. Off.
490471A2 6/1992 European Pat. Off.

OTHER PUBLICATIONS

Karen L. Acerson, Word Perfect—The Complete Reference, 1988, pp. 245–248.

Primary Examiner—Mark R. Powell
Assistant Examiner—B. Huynh
Attorney, Agent, or Firm—Gary B. Cohen

[57] ABSTRACT

A method is provided for labeling a job in a printing system. The method includes the steps of partitioning the job into a first set with a plurality of electronic pages and a second set with a plurality of electronic pages; storing a first electronic label and a second electronic label in memory; and displaying, on a display screen, a print outline with a selected identifiable area, the selected identifiable area being positionable on the print outline for representing a relative size, location and orientation of an area on a print upon which an electronic label is to be printed. In practice a first location, at which a copy of the first electronic label is to be printed on a first selected print resulting from the printing of the plurality of electronic pages of the first set and a second location, at which a copy of the second electronic label is to be printed on a second selected print resulting from the printing of the plurality of electronic pages of the second set, are indicated with the print outline. In response to such indication, a first print set, with the copy of the first electronic label applied on the first selected print at the first location, and a second print set, with the copy of the second electronic label applied on the second selected print at the second location, are produced.

9 Claims, 31 Drawing Sheets

FIG. 7

METHOD OF APPLYING ELECTRONICALLY STORED LABELS TO A PRINT JOB

The present application is a continuation-in-part of now allowed U.S. patent application Ser. No. 07/628,130, filed Dec. 14, 1990, now U.S. Pat. No. 5,309,558. by Rourke et al., which is assigned to the same assignee of the present application.

The present invention relates generally to a technique for producing a print job, having a plurality of sets, with a printing system and, more particularly, to a method for printing a label on at least one print, at a designated location, in each set of the print job.

Electronic printing systems employ image signals or pixels as the image source when producing prints. In using printing systems of this type, a very desirable option would be the ability to automatically add information, i.e., addresses or labels, to the prints or print sets as they are produced. This would save the cost, time, and bother of subsequently addressing or labeling the prints later as, for example, by pasting address labels on the prints, handwriting the addresses, etc. To gain maximum use of an option of this type, referred to as set addressing herein, the user must have the ability to pick and choose the addresses that are to be used. This requires editing capability that will allow the user to temporarily remove some addresses from his/her address list in accordance with the demands of a particular job. Further, the user needs the ability to re-shuffle the order and position of the addresses or labels in the address or label list, to add addresses and/or labels from other lists, to change the size of the addresses/labels and the position of the addresses/labels on the prints, etc. And, there also should be provided a way in which the user can easily create new electronic address/label lists to add to the operator's address/label library for future jobs.

In the prior art, U.S. Pat. Nos. 4,521,096 to Suganuma et al. and 4,322,157 to Miura et al. disclose apparatus for combining information from different forms to generate documents with composite images based on data from several image memory sources. U.S. Pat. No. 4,639,791 to Masaki discloses an image overlay apparatus with electronic image storage in which a combined image is created by overlaying images from two different sources. And U.S. Pat. No. 4,124,286 to Barasch discloses a system for printing a composite image wherein a first image is formed on a photoconductive media and then transferred to a second photoconductive media where a second image is formed to overlay the first image.

The following is a list of references cited during the U.S. prosecution of the parent application of the present application:

U.S. Pat. No. 4,306,803 Patentees: Donohue et al. Issued: Dec. 22, 1981
U.S. Pat. No. 4,494,862 Patentee: Tanaka Issued: Jan. 22, 1985
U.S. Pat. No. 4,674,040 Patentees: Barker et al. Issued: Jun. 16, 1987
U.S. Pat. No. 4,920,337 Patentee: Kuo Issued: Apr. 24, 1990
U.S. Pat. No. 4,992,827 Patentees: Kobayashi et al. Issued: Feb. 12, 1991
U.S. Pat. No. 5,016,048 Patentee: Watanabe Issued: May 14, 1991
U.S. Pat. No. 5,091,746 Patentee: Watanabe Issued: Feb. 25, 1992
Acerson, K. L. "WordPerfect ®: The Complete Reference McGraw-Hill
Published: 1988 pp. 245-48

The following is a list of references cited during the European prosecution of the parent application of the present application:

U.S. Pat. No. 4,085,445 Patentees: Blevins et al. Issued: Apr. 18, 1978
U.S. Pat. No. 4,542,378 Patentees: Suganuma et al. Issued: Sep. 17, 1985
European Patent Application No.: 89123569.9 Publication No.: 0374 892A2 Date of Publication: Jun. 27, 1990

The above-mentioned parent application of the present application was published as the following European patent application:

European Patent Application No.: 91308840.7 Publication No.: 0490 471A2 Date of Publication: Jun. 17, 1992

While this European patent application discloses the concept of printing an address on each page of a job, it is believed that this European patent application does not comprehend fully the many ways in which an address or label can be printed on selected pages of the job. It would be desirable to provide a system in which an operator possesses a great deal of flexibility in designating where labels are to be printed within one or more sets of the job.

In one aspect of the disclosed invention there is provided a method of labeling a job in a printing system, including the steps of: partitioning the job into a first set with a plurality of electronic pages and a second set with a plurality of electronic pages; storing, in memory, a first electronic label and a second electronic label; displaying, on a display screen, a print outline with a selected identifiable area, the selected identifiable area being positionable on the print outline for representing a relative size, location and orientation of an area on a print upon which an electronic label is to be printed; indicating, with the print outline, a first location at which a copy of the first electronic label is to be printed on a first selected print resulting from the printing of the plurality of electronic pages of the first set, and a second location at which a copy of the second electronic label is to be printed on a second selected print resulting from the printing of the plurality of electronic pages of the second set; and printing the first set, so that the copy of the first electronic label is printed on the first selected print at the first location, and the second set, so that the copy of the second electronic label is printed on the second selected print at the second location.

In another aspect of the disclosed invention there is provided a method of labeling a job, with a total number of electronic pages, in a printing system, including the steps of: partitioning the job into M sets of electronic pages with a first set and an Mth set; storing, in memory, a first list of N electronic labels with a first electronic label and an Nth electronic label; displaying, on a display screen, a print outline with a selected identifiable area, the selected identifiable area being positionable on the print outline for representing a relative size, location and orientation of an area on a print upon which an electronic label is to be printed; indicating, with the print outline, first locations at which copies of the N electronic labels of the list are to be respectively printed on a selected number of prints resulting from the printing of a corresponding number of electronic pages of the M sets, wherein the corresponding number of electronic pages is less than the total number of electronic pages of the job; printing copies of the N electronic labels from the first list of N electronic labels successively on the M sets, at the indicated first locations, wherein a copy of first electronic label is printed on a selected print of the first set and the Nth electronic label is printed on a selected print of the Mth set.

These and other aspects of the invention will become apparent from the following description, the description being used to illustrate a preferred embodiment of the invention when read in conjunction with the accompanying drawings.

Figure 1:
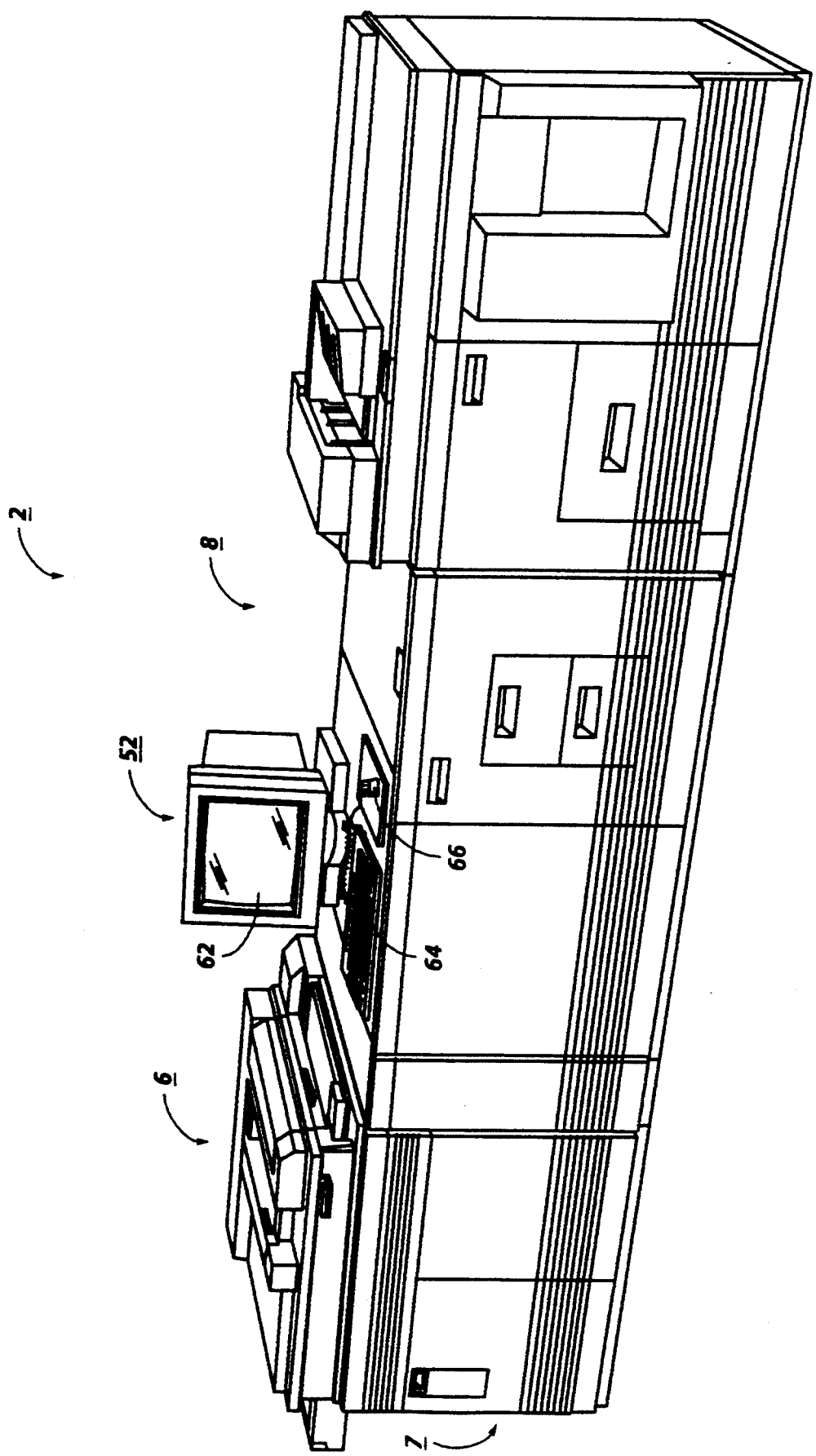
FIG. 1 is a perspective view depicting an electronic printing system incorporating the set addressing process of the present invention.
Figure 5A:
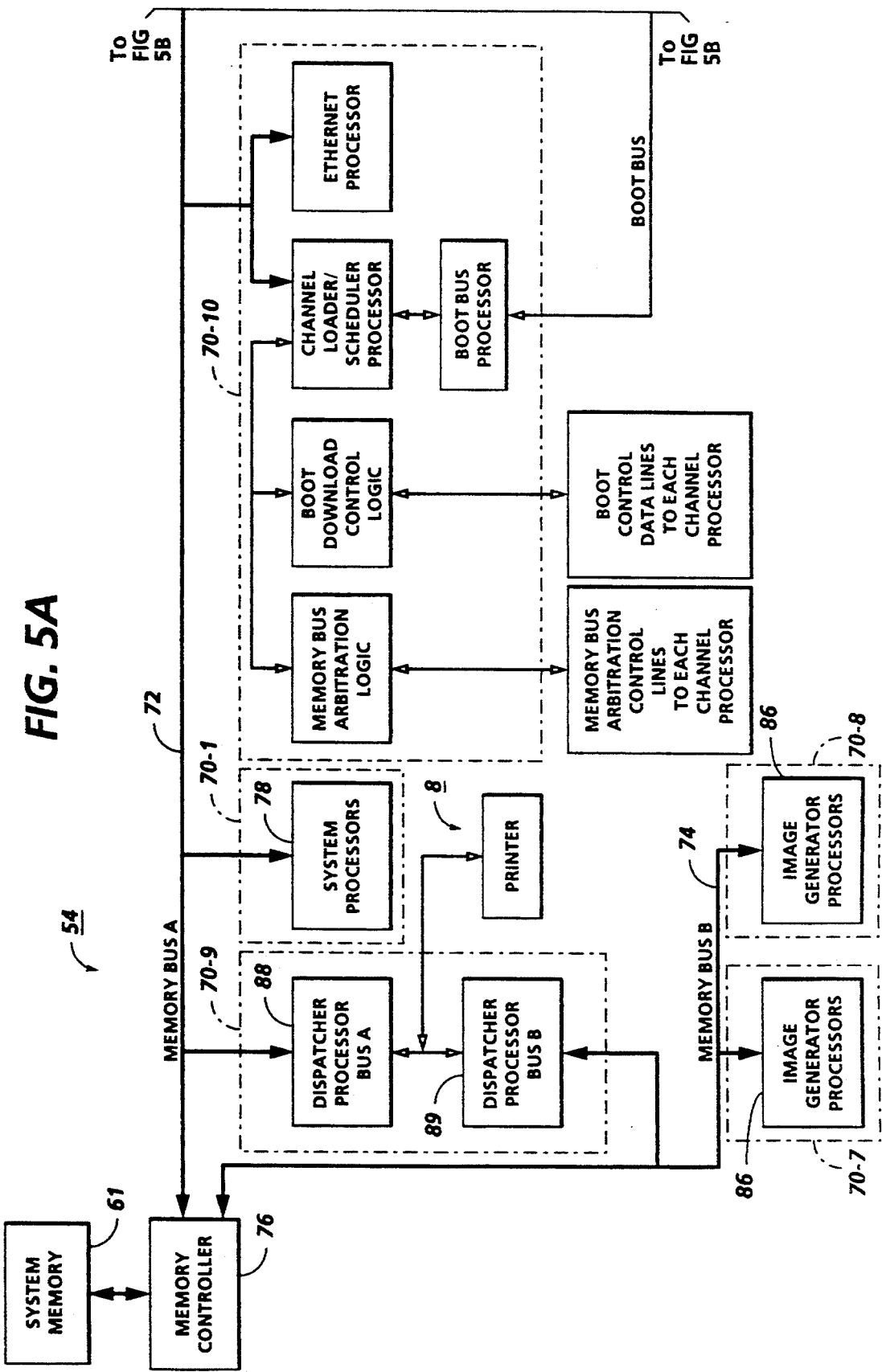
Figure 5B:
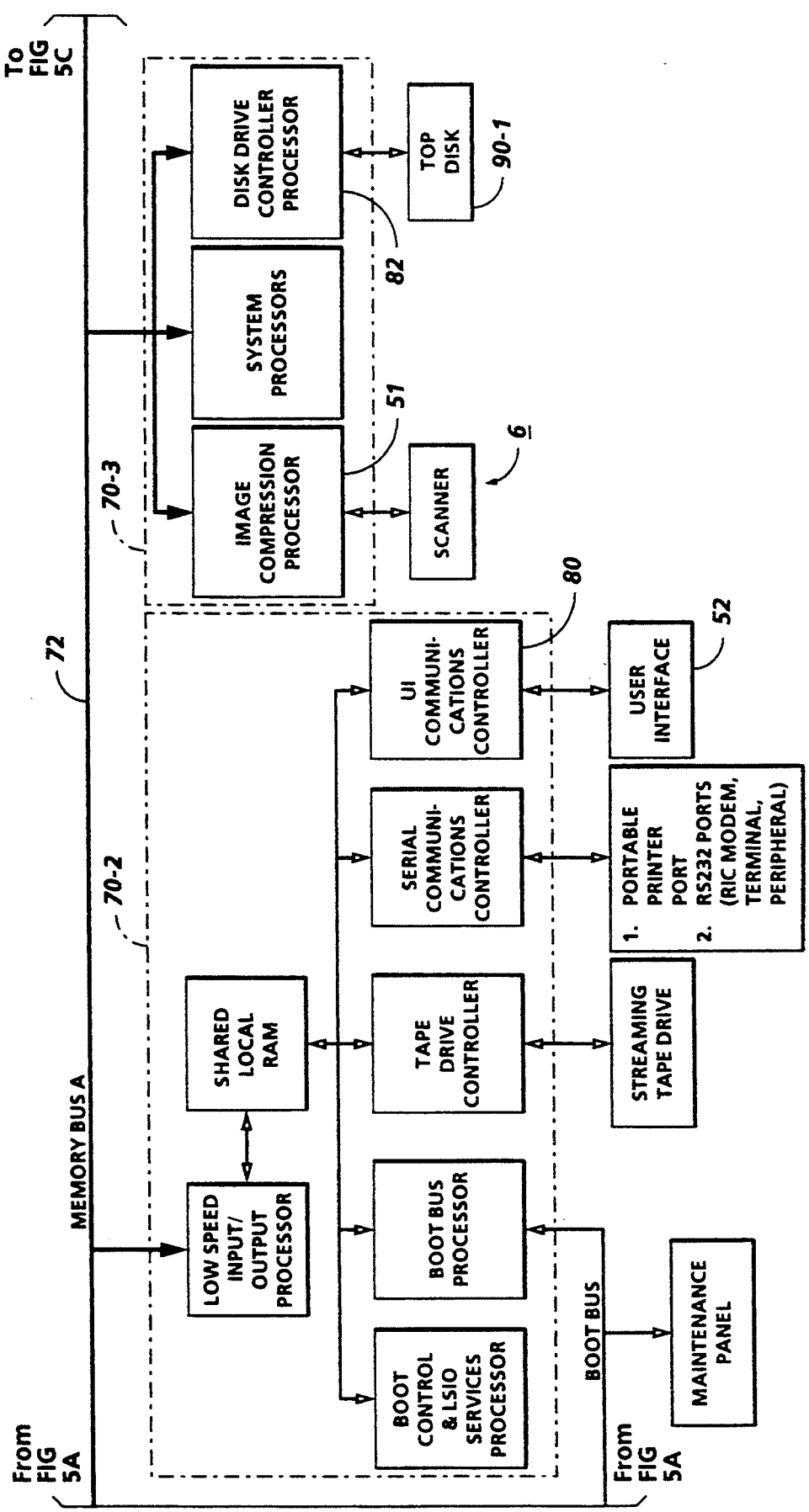
Figure 5C:
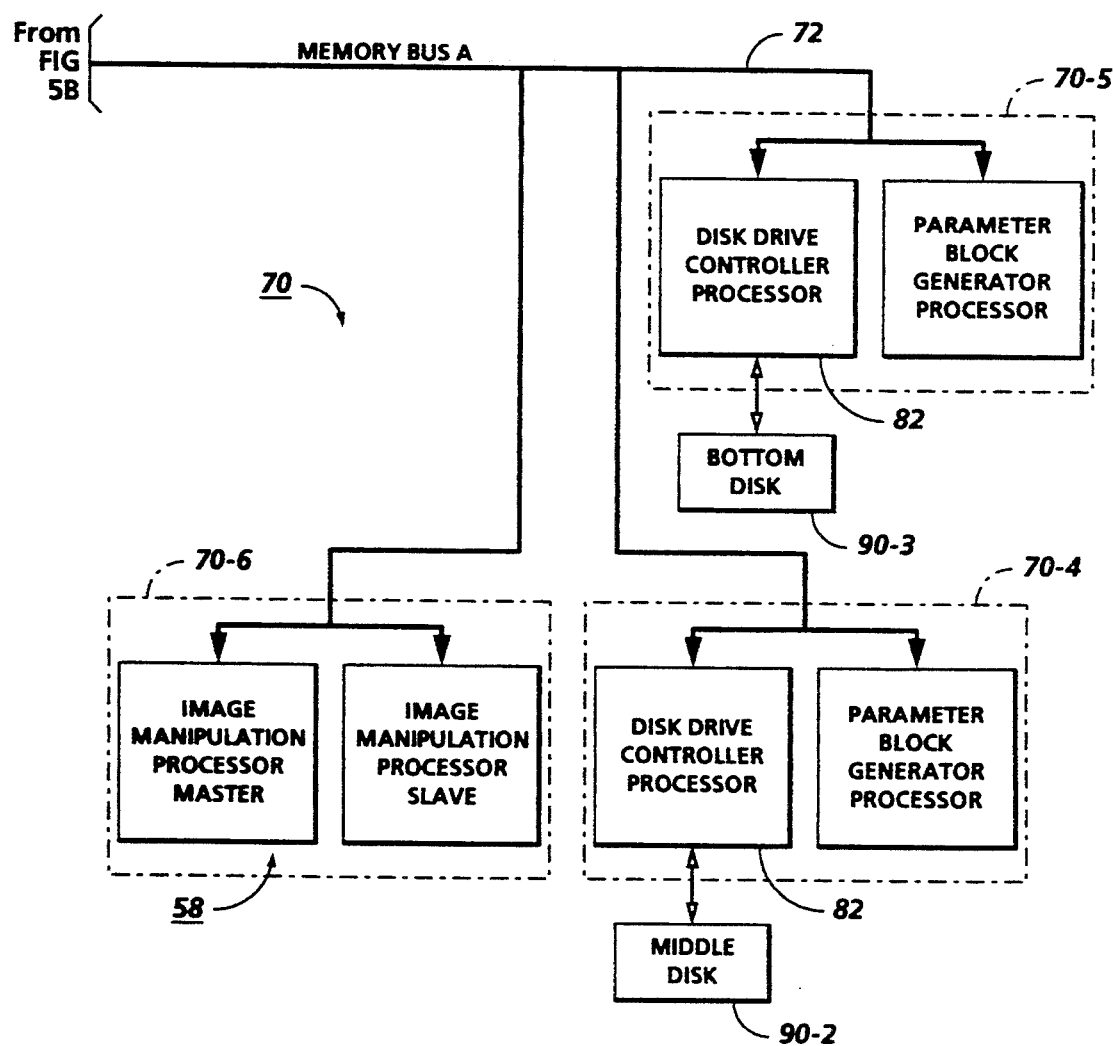
Figure 6:
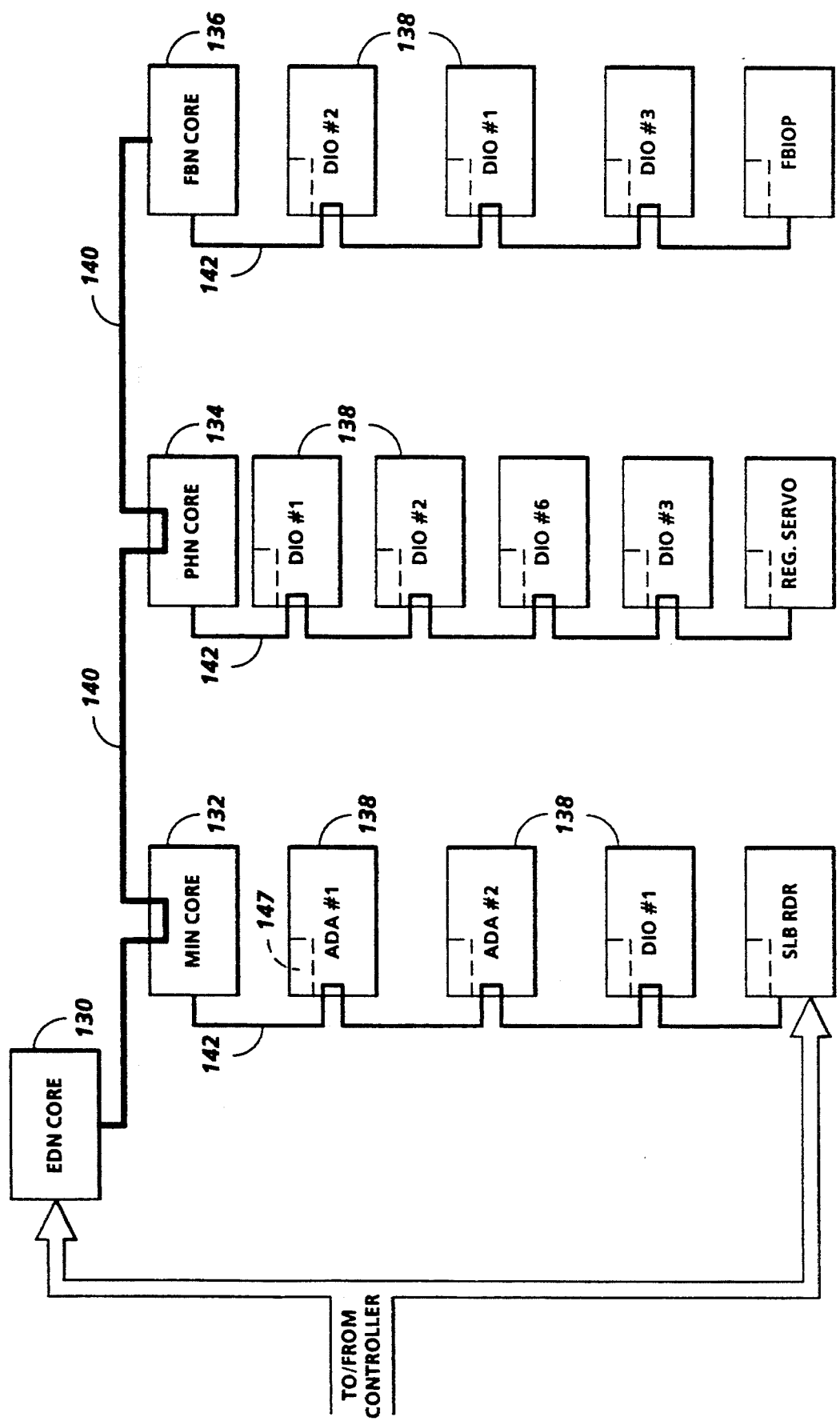
Figure 8:
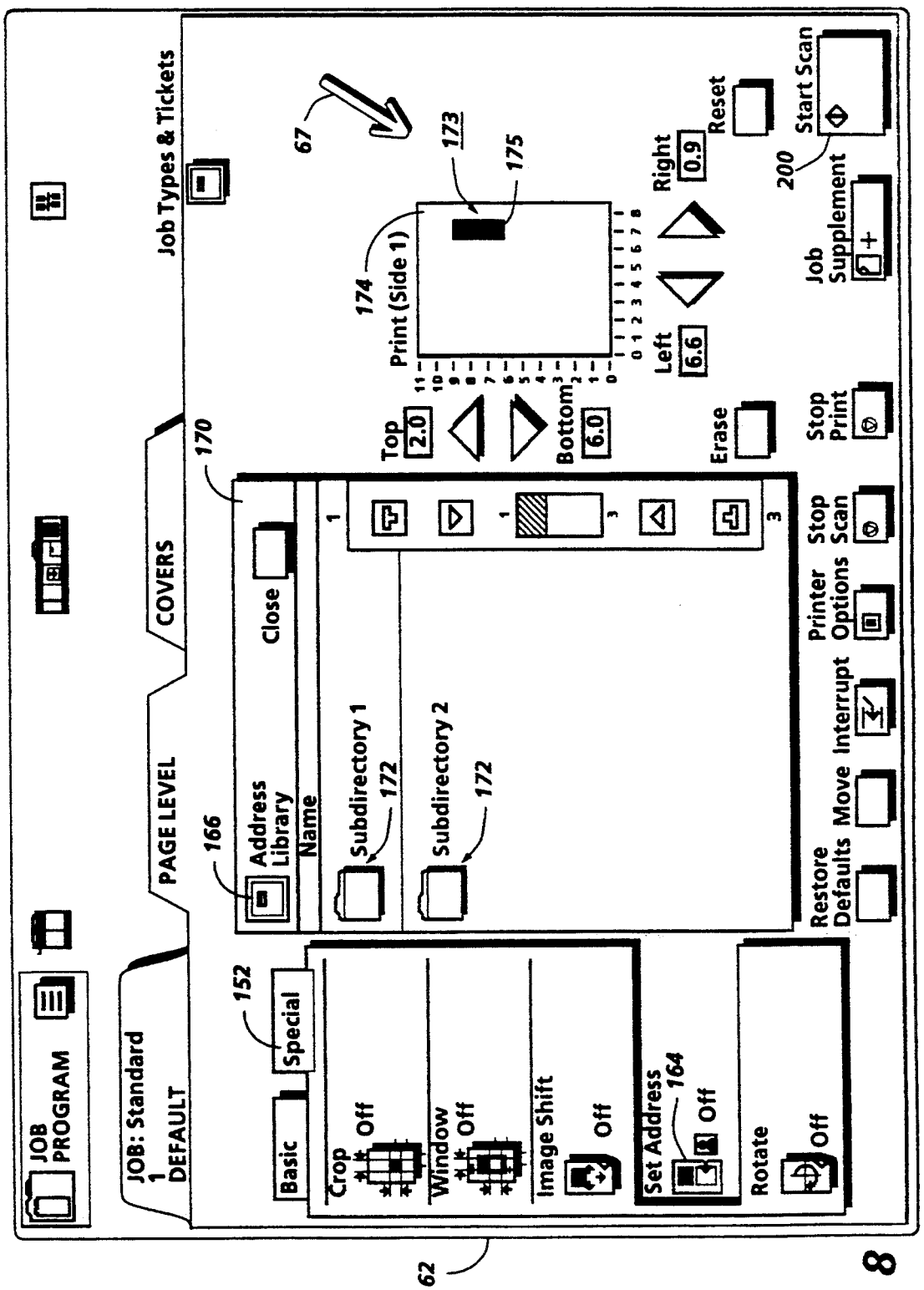
Figure 9:
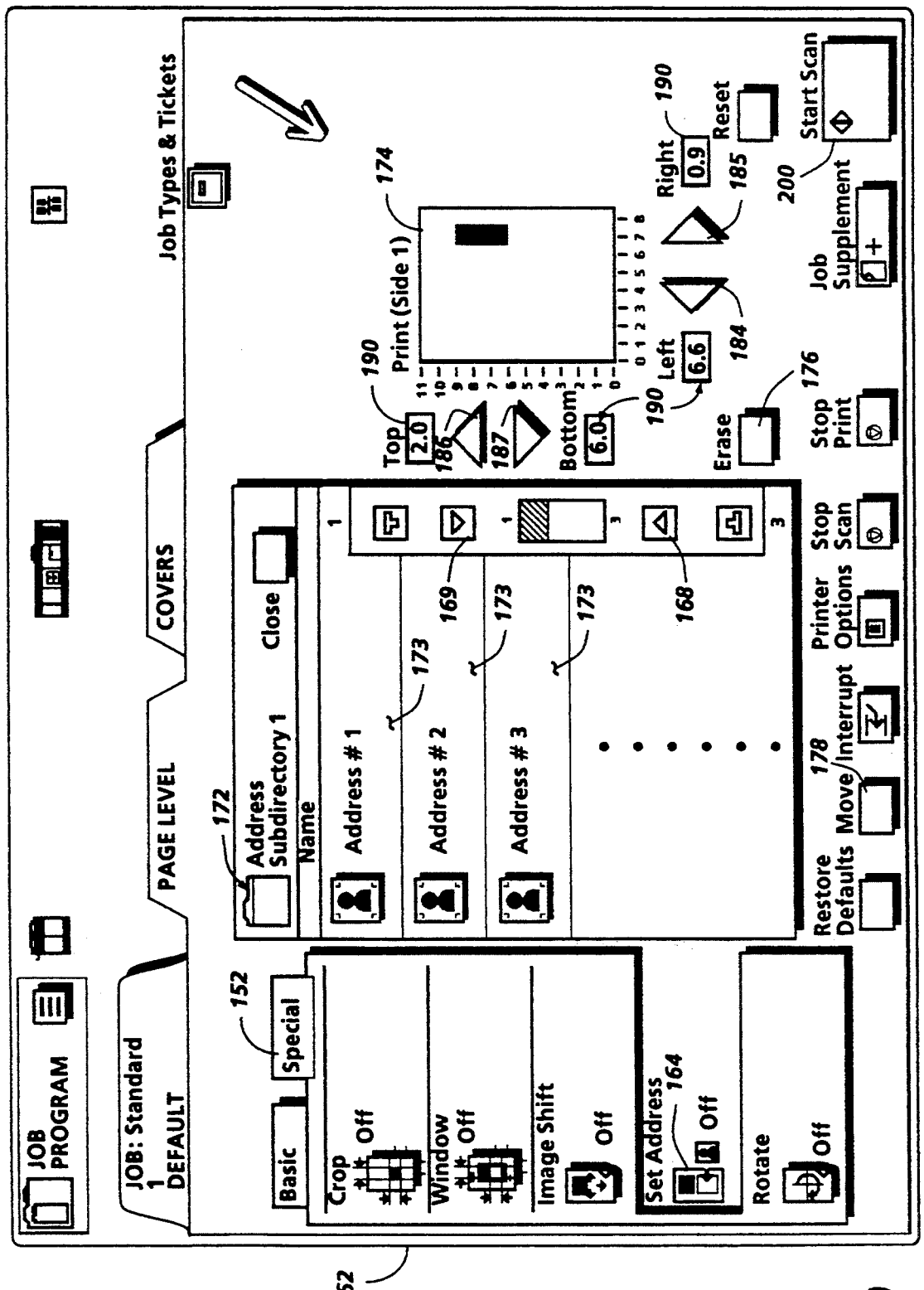
Figure 10:
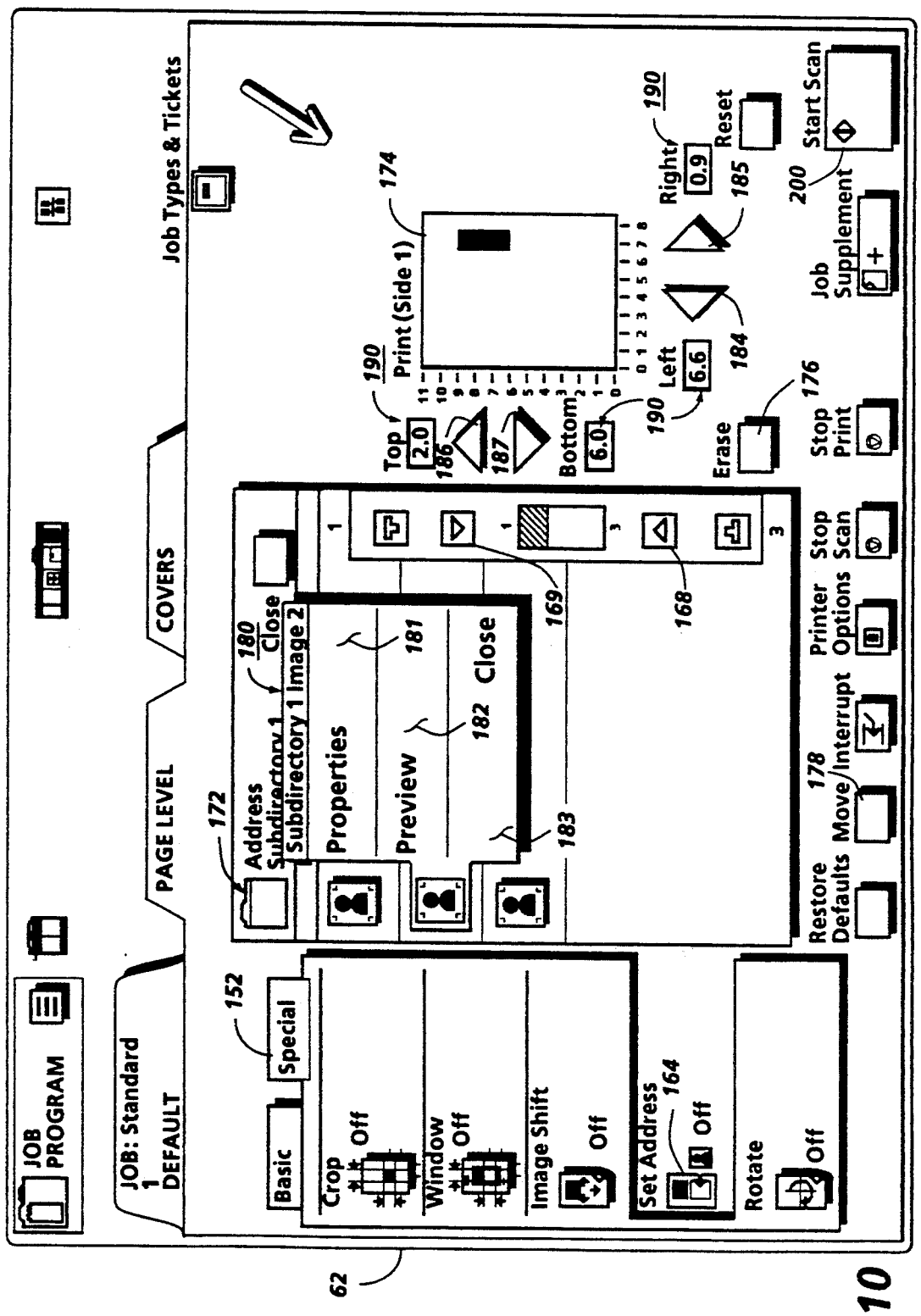
Figure 11:
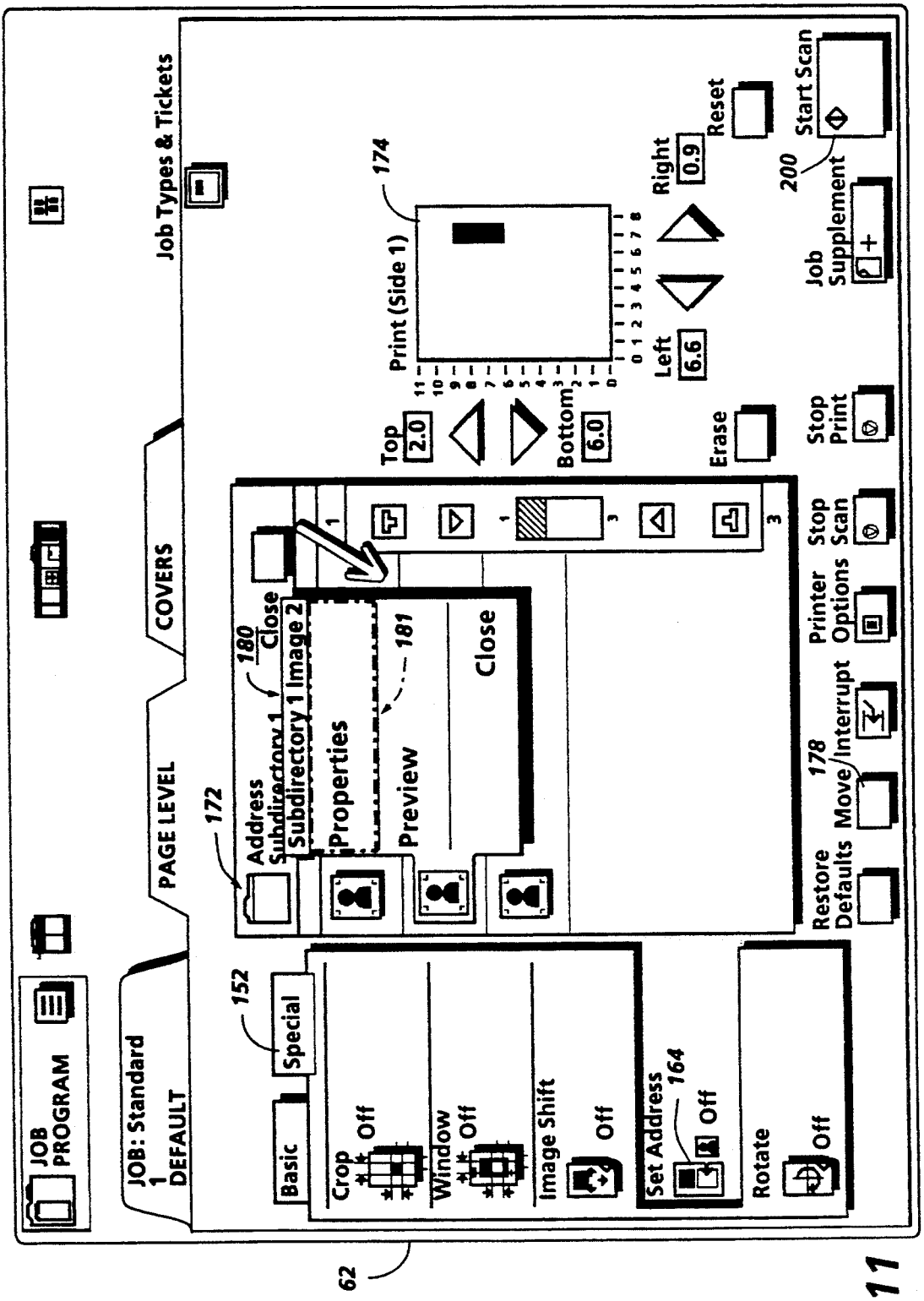
Figure 12:
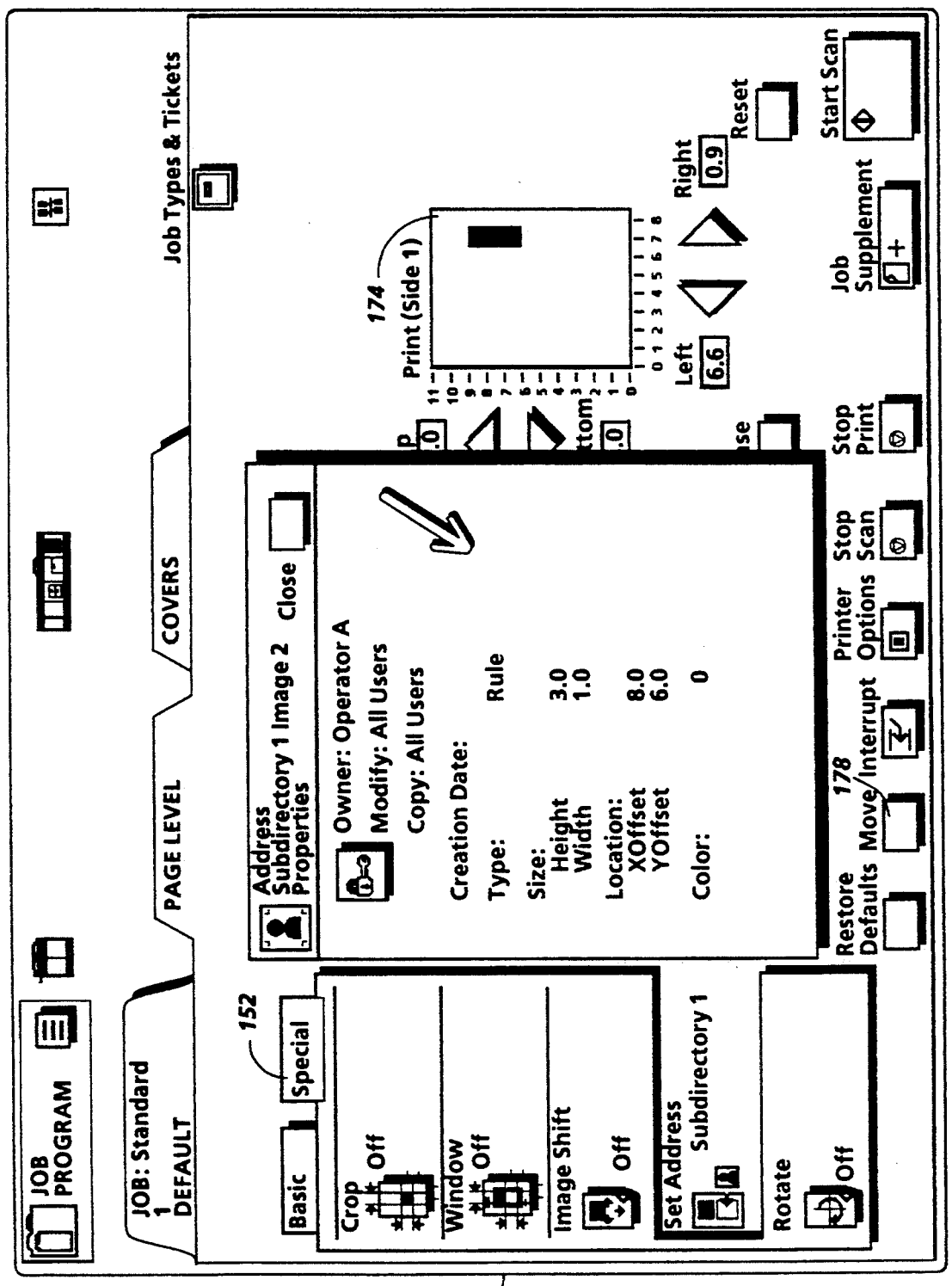
Figure 13:
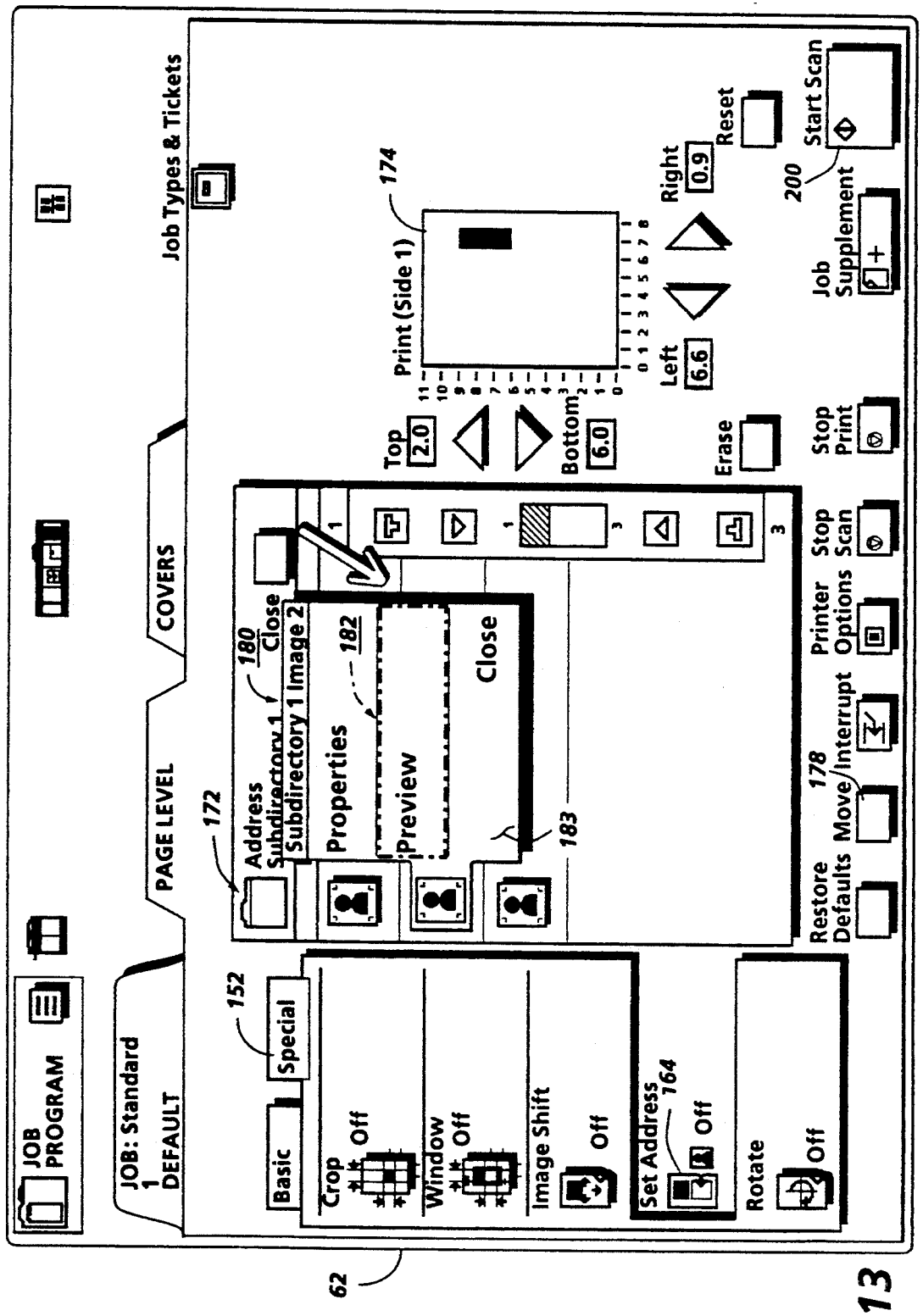
Figure 14:
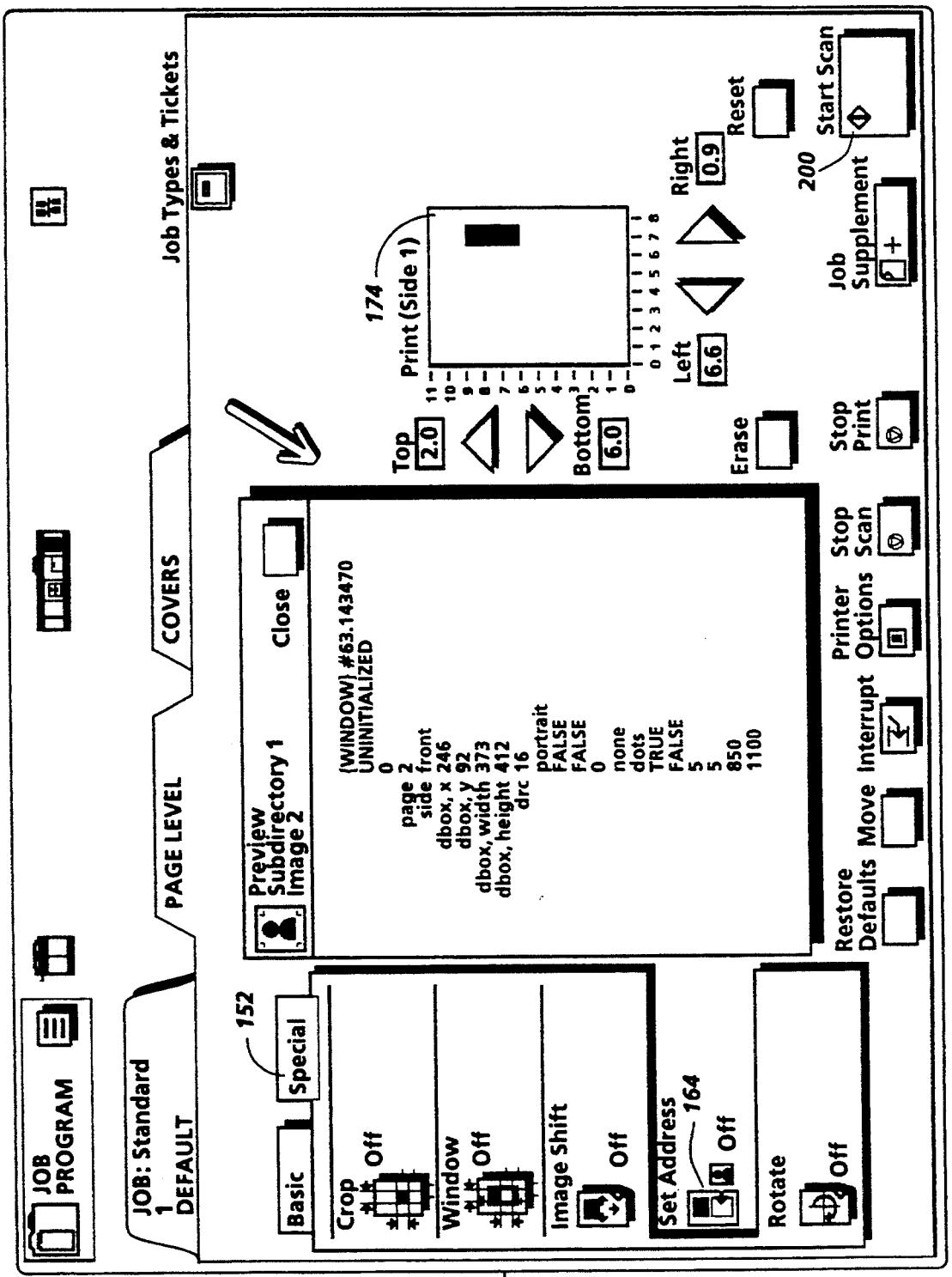
Figure 15A:
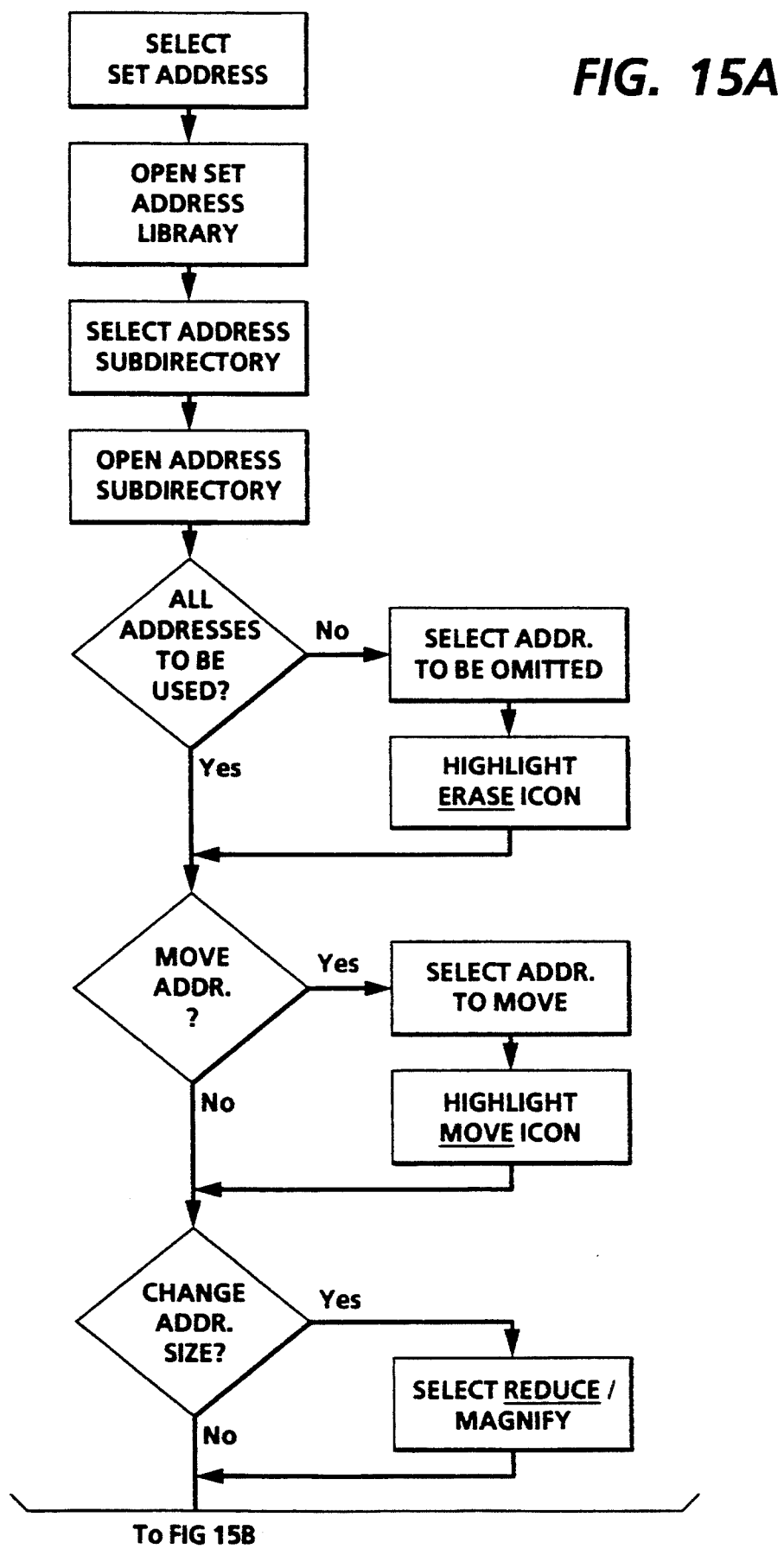
Figure 15B:
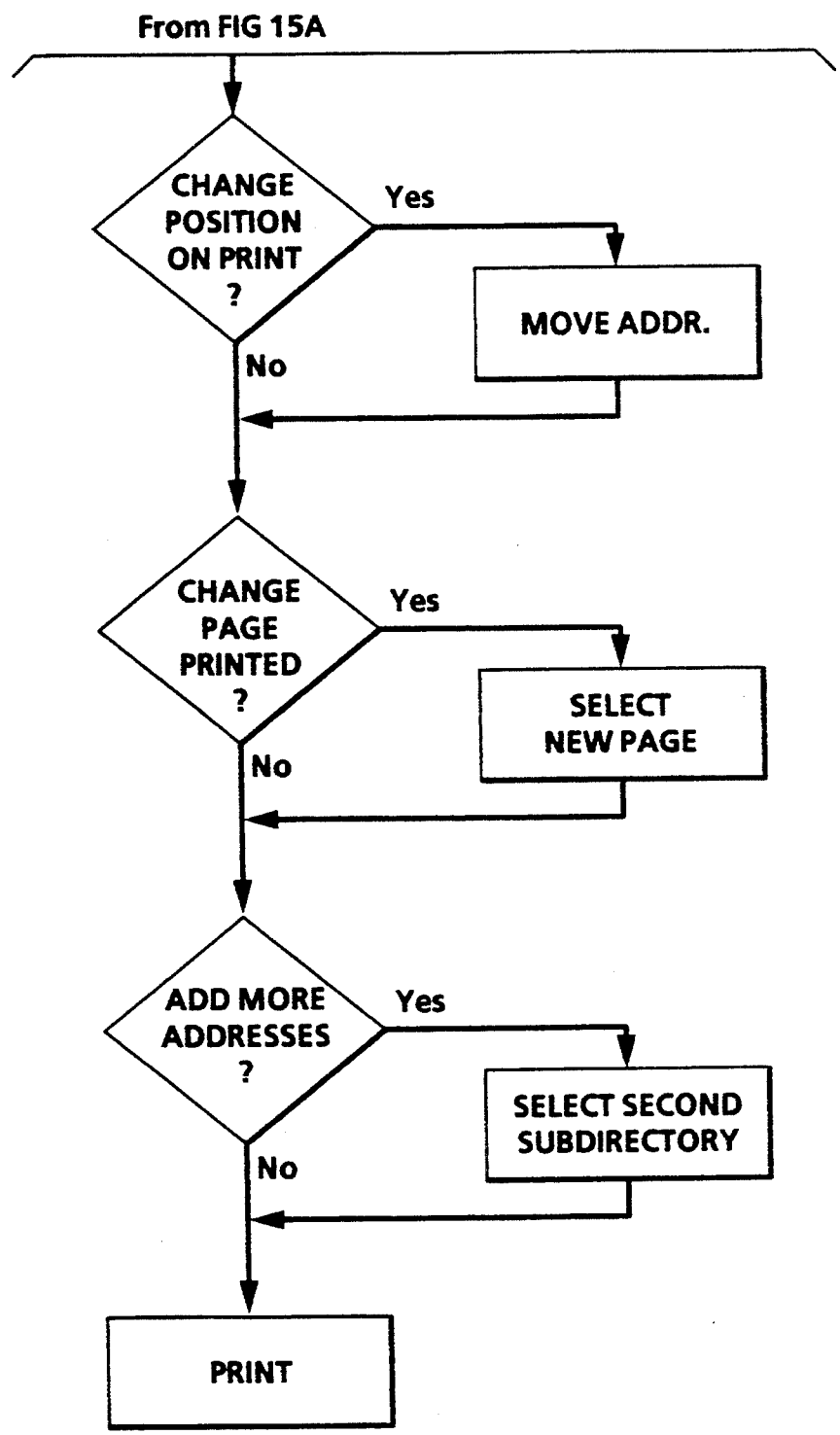
Figure 16:
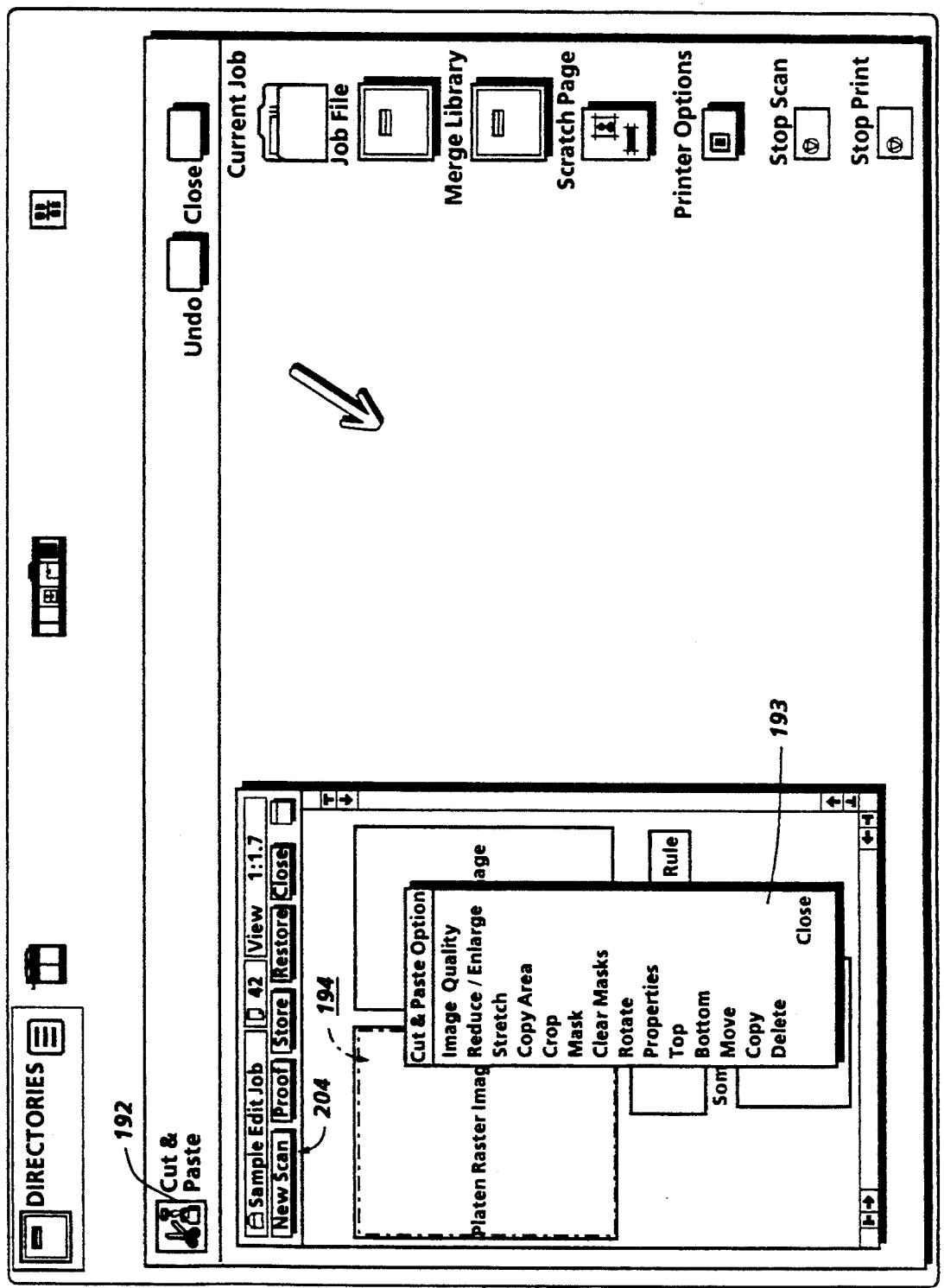
Figure 17:
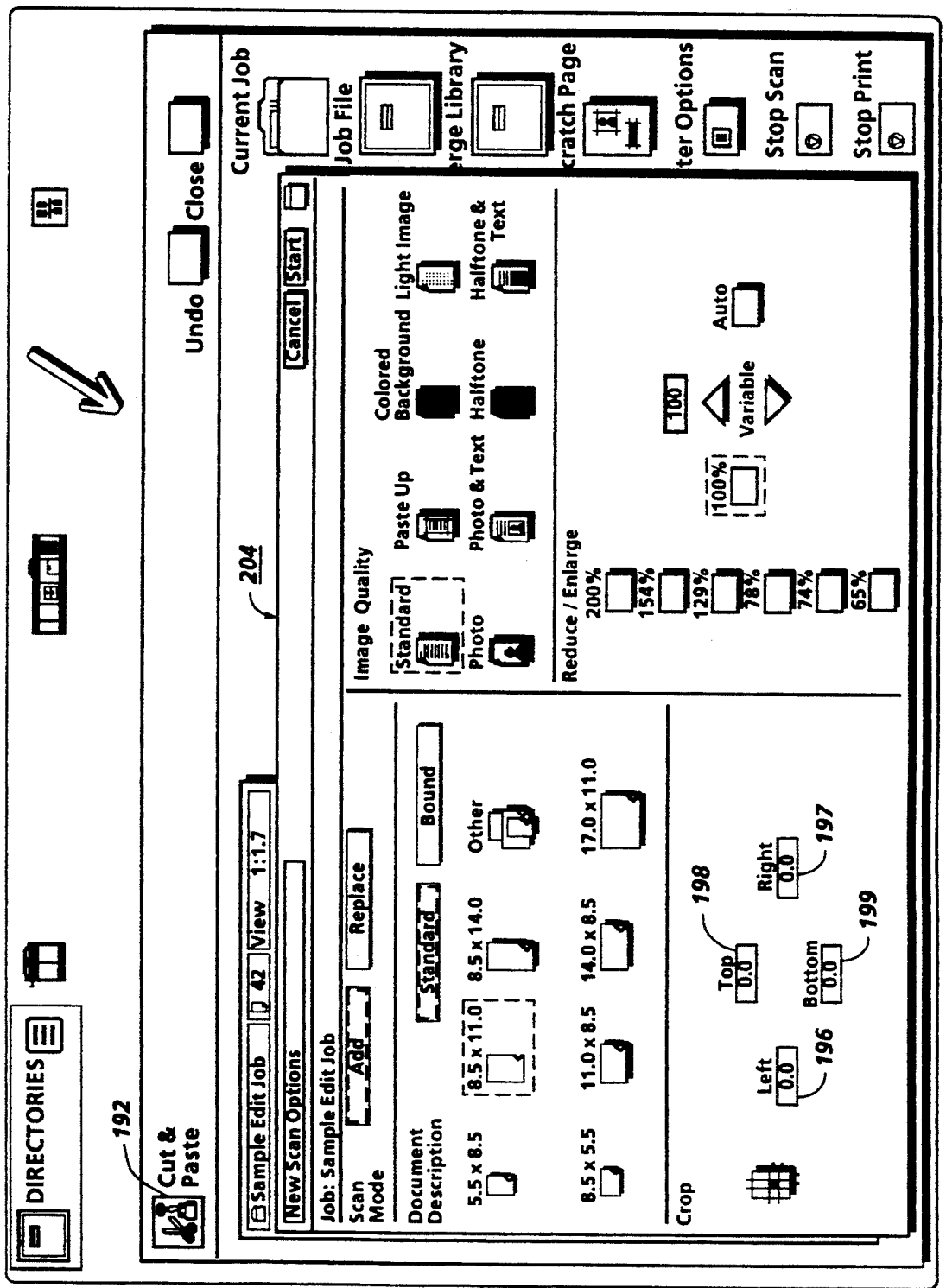
Figure 18:
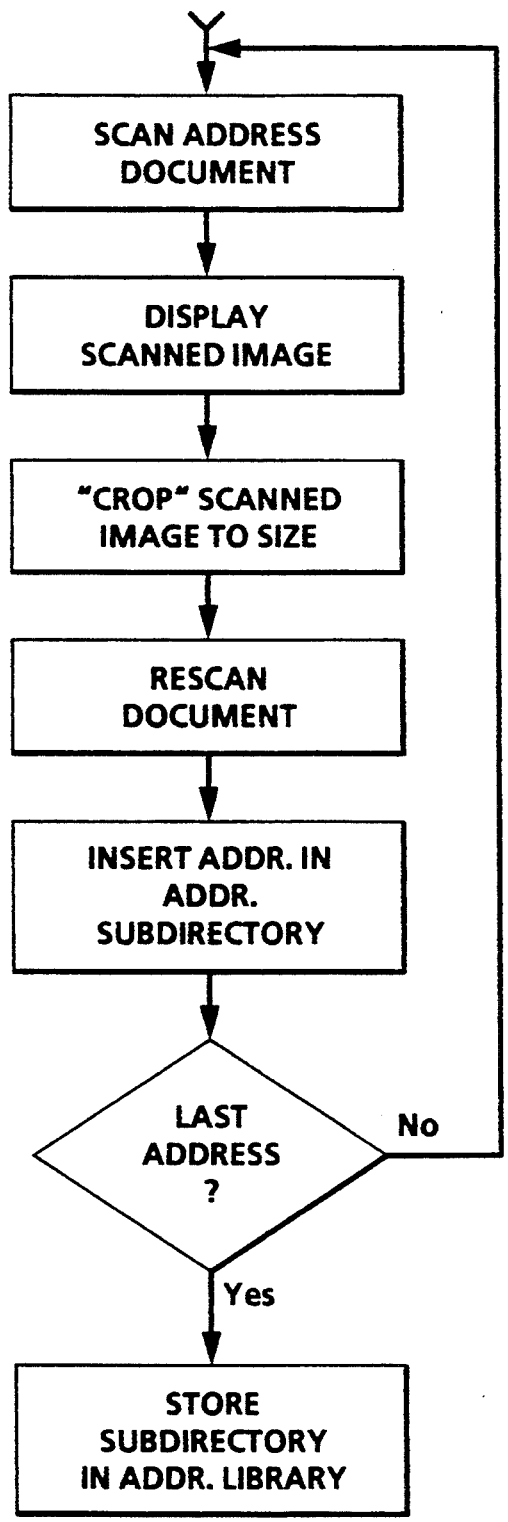
Figure 19:
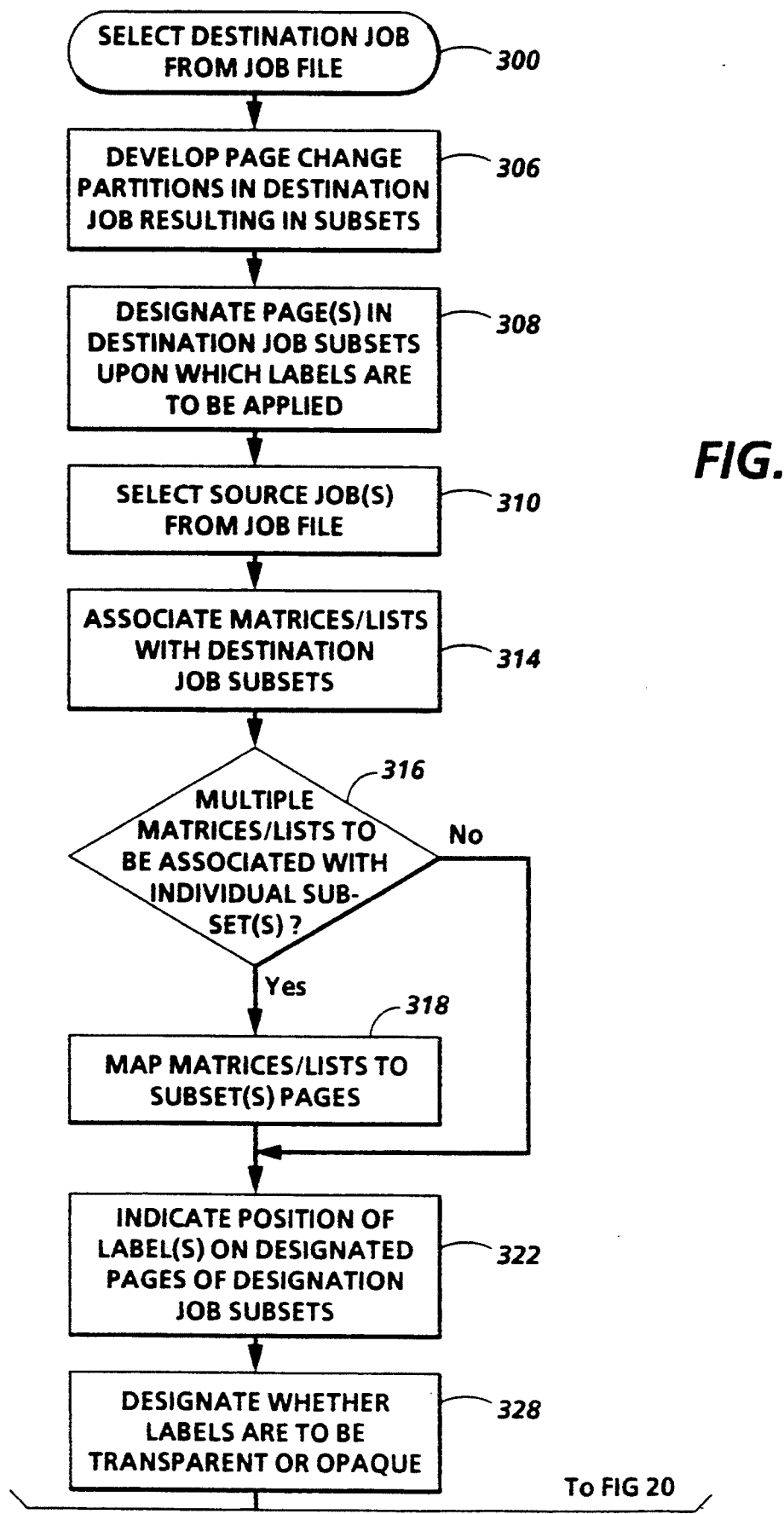
Figure 20:
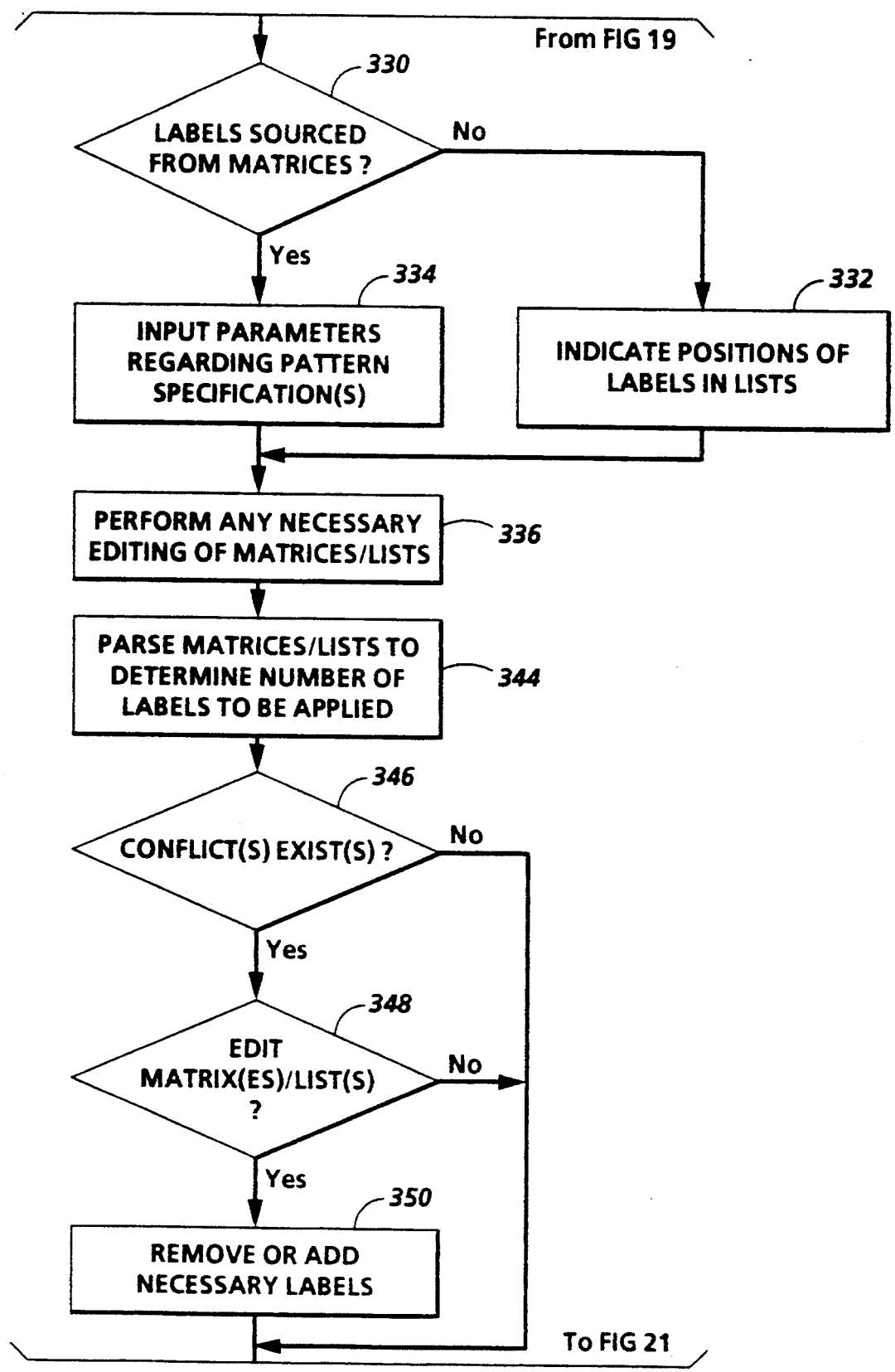
Figure 21:
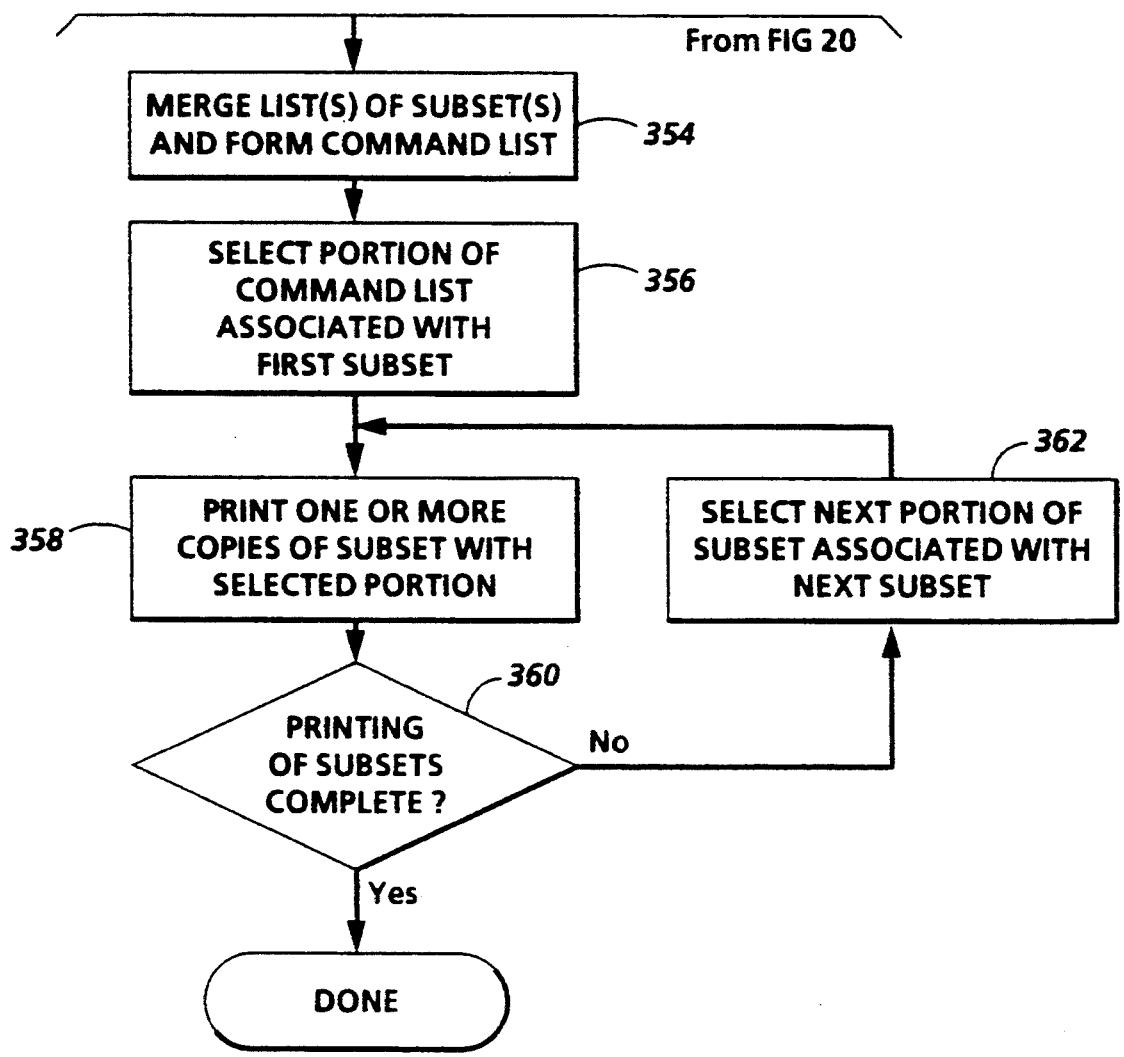
Figure 22:
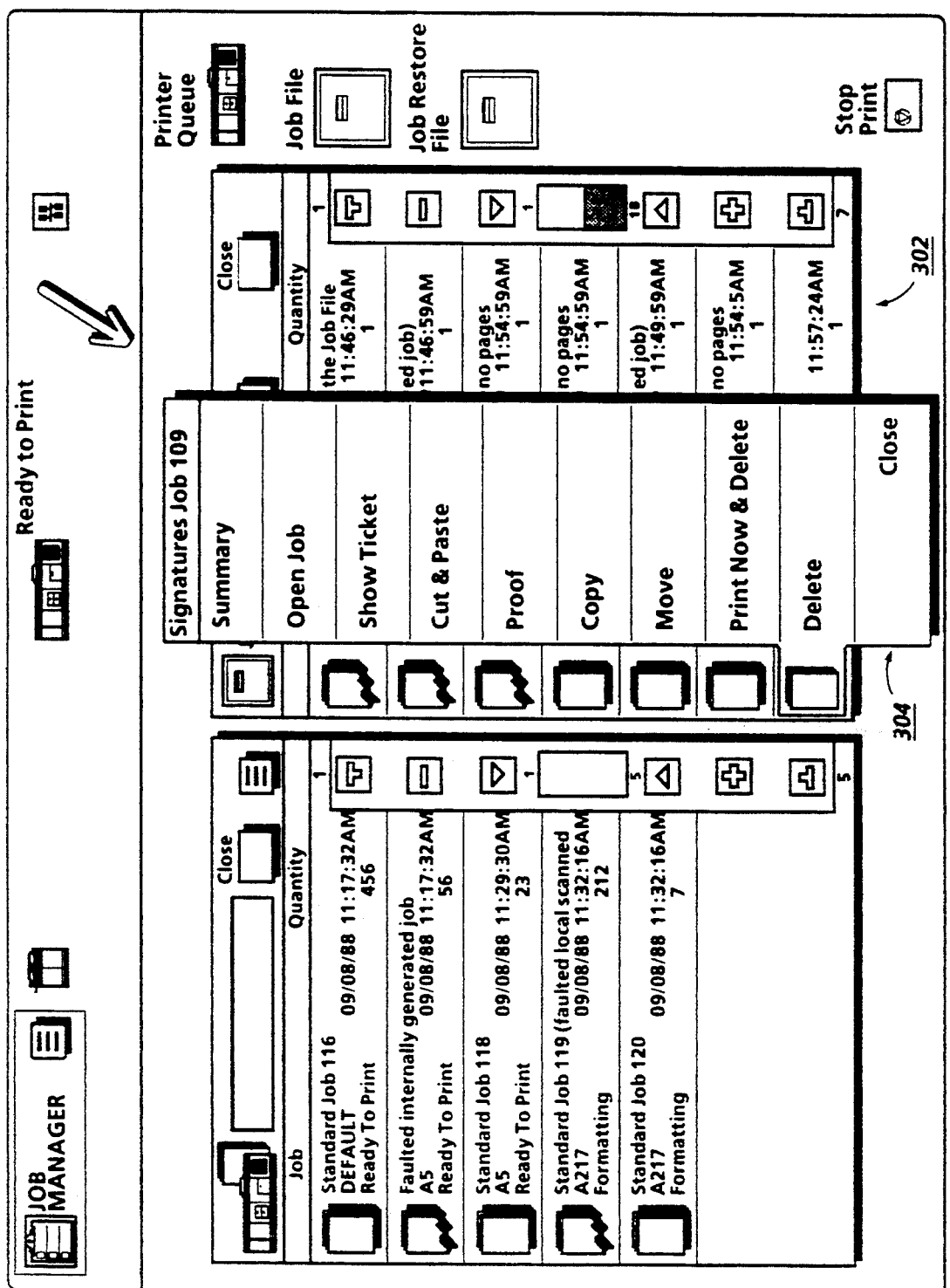
Figure 23:
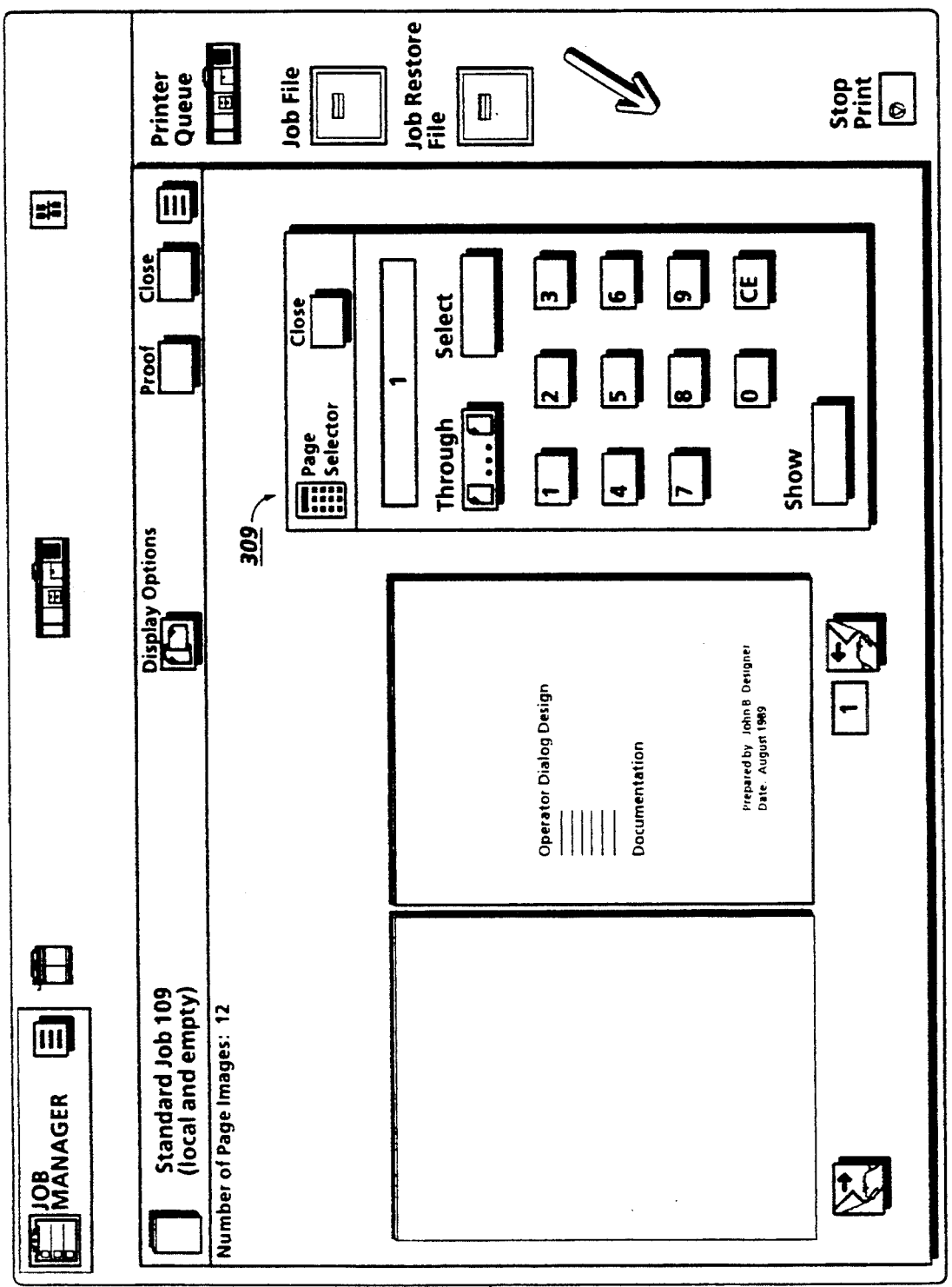
Figure 24:
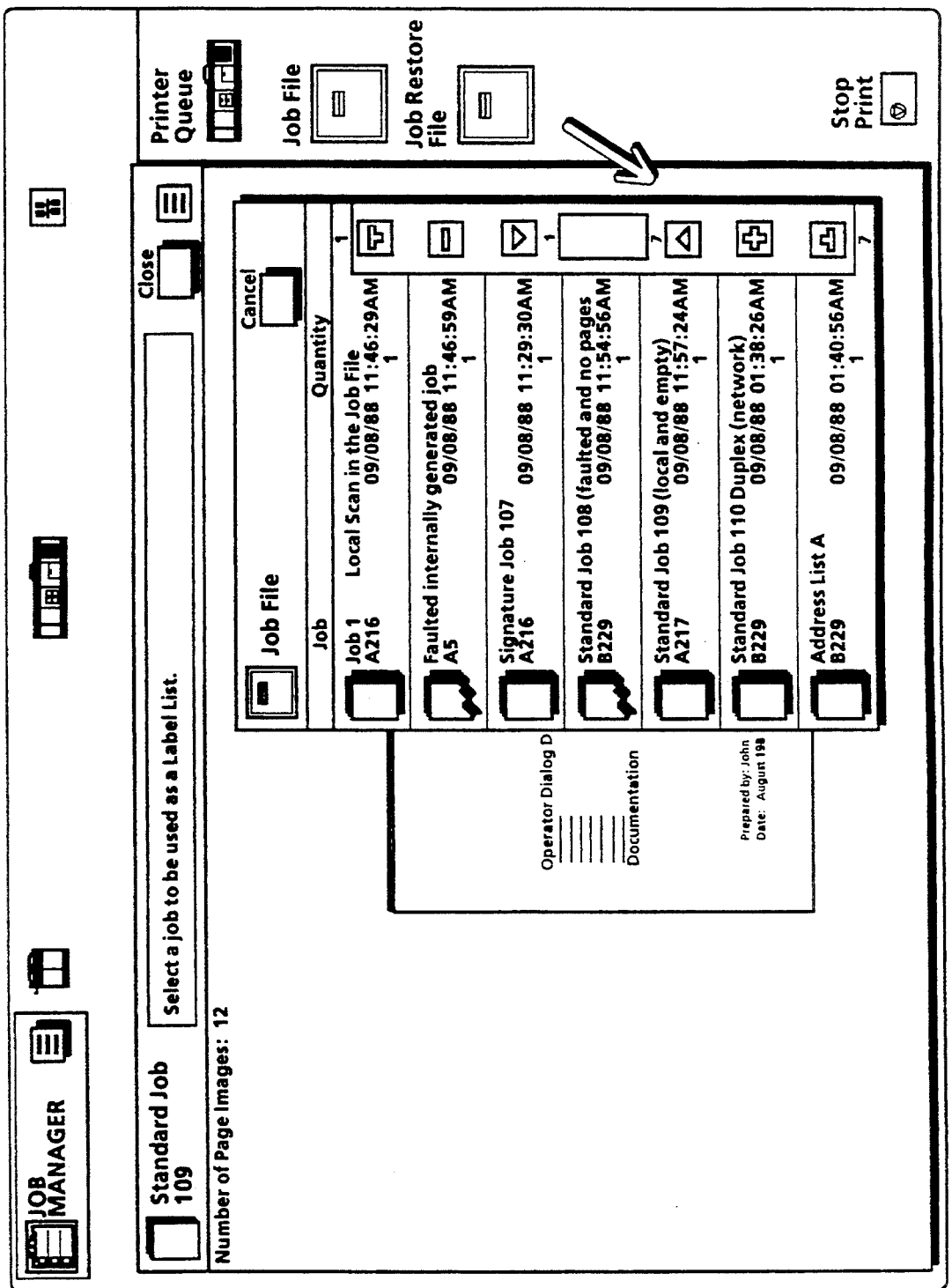
Figure 25:
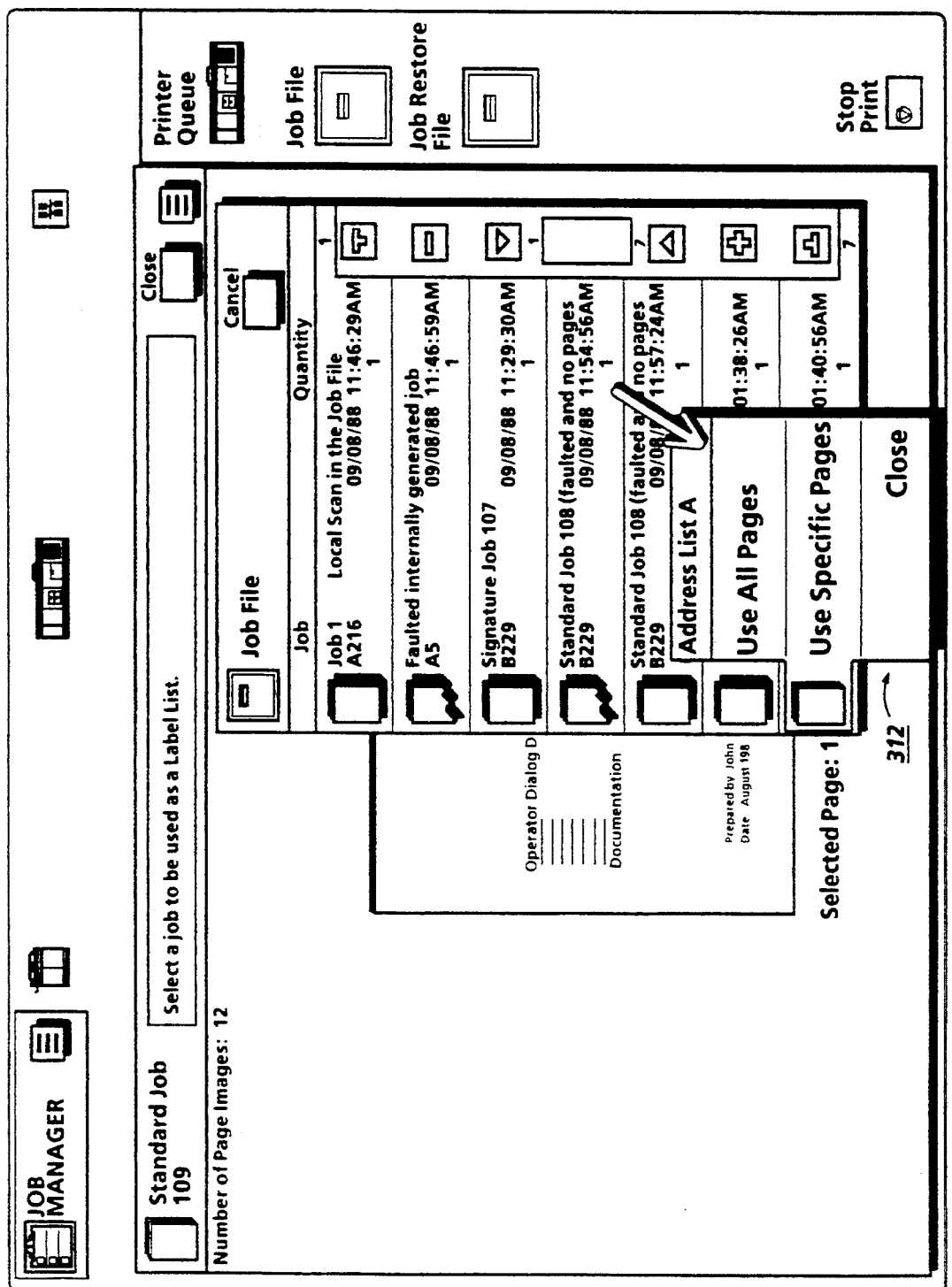
Figure 26:
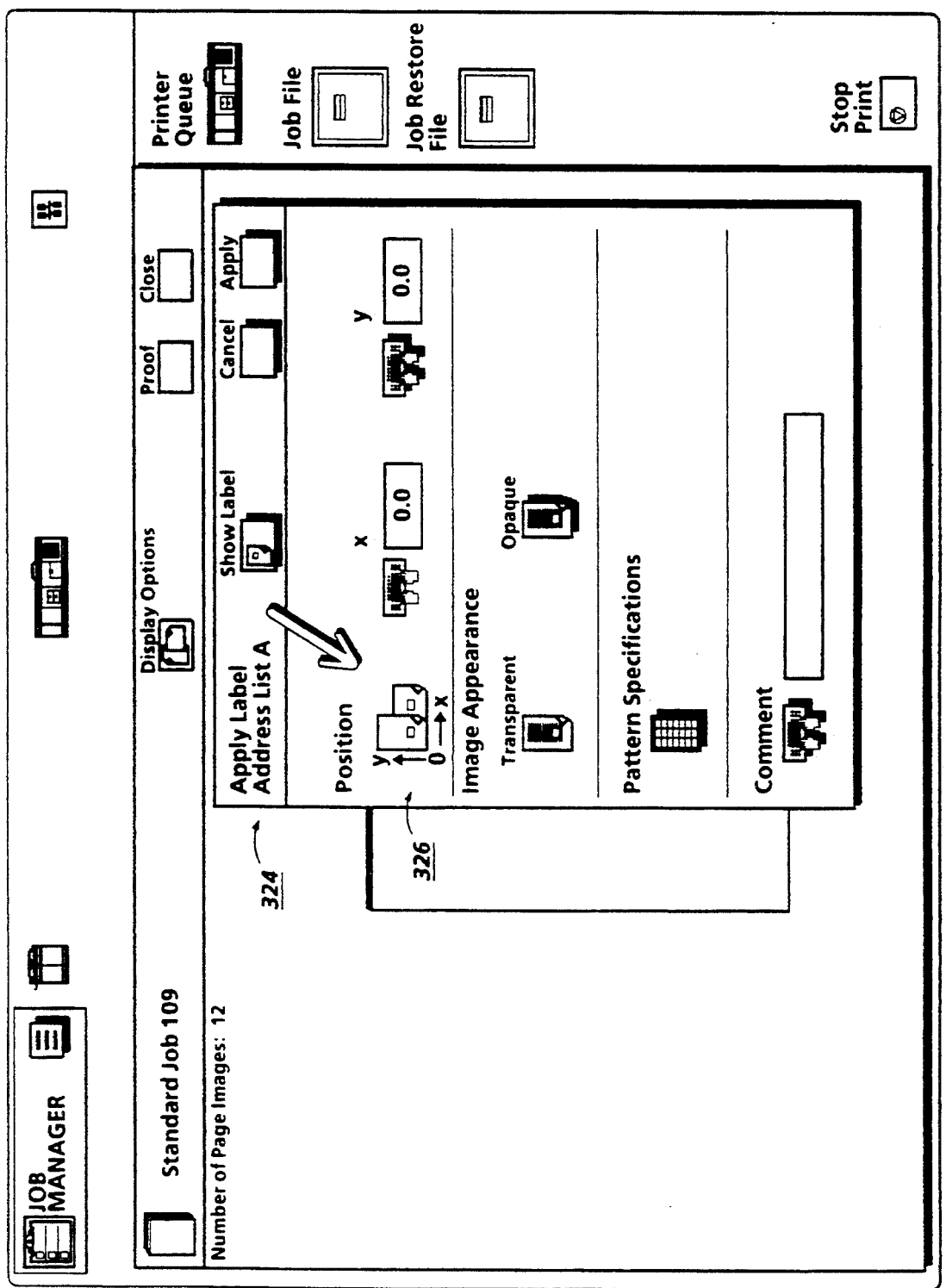
Figure 27:
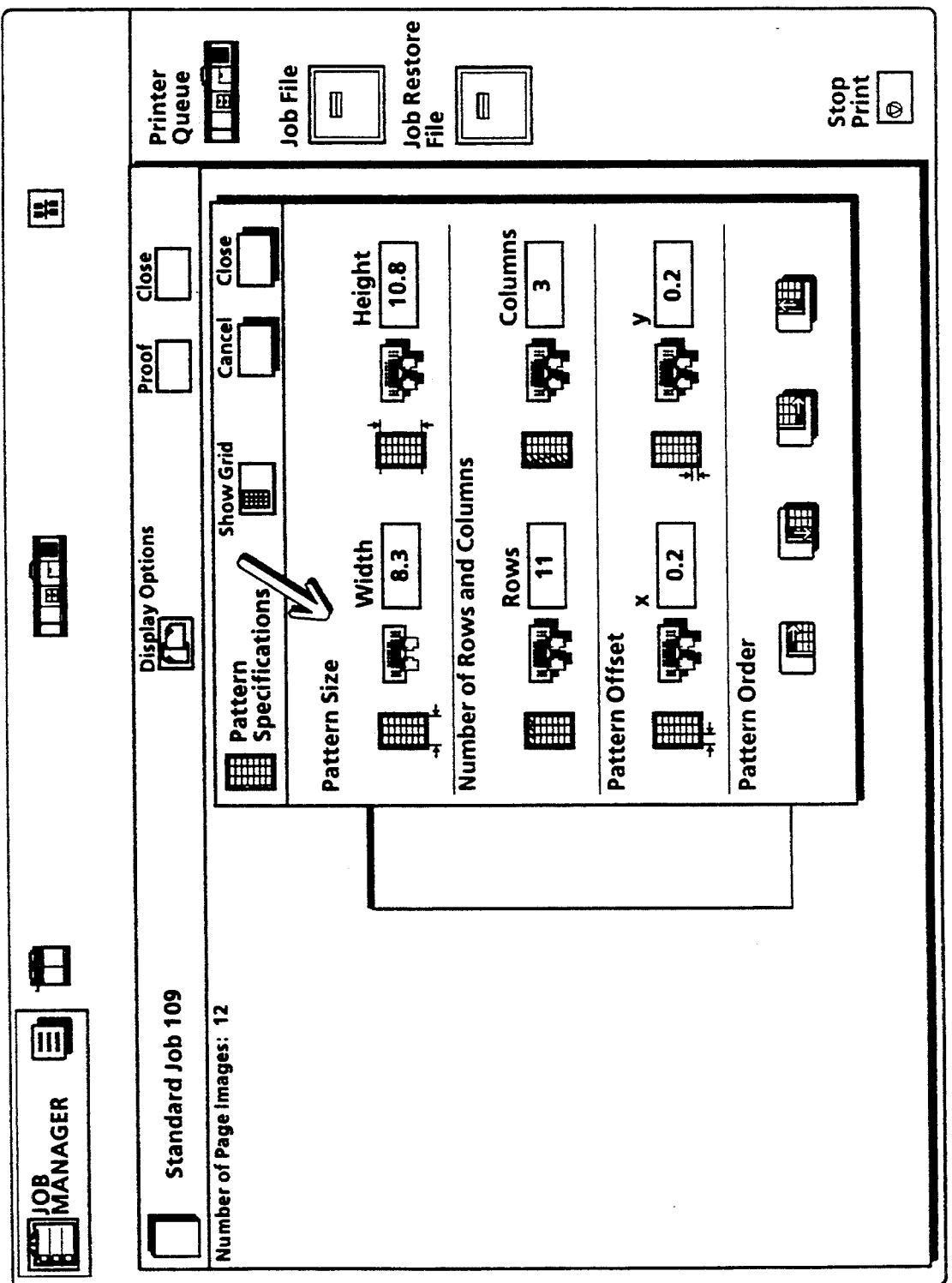
Figure 28:
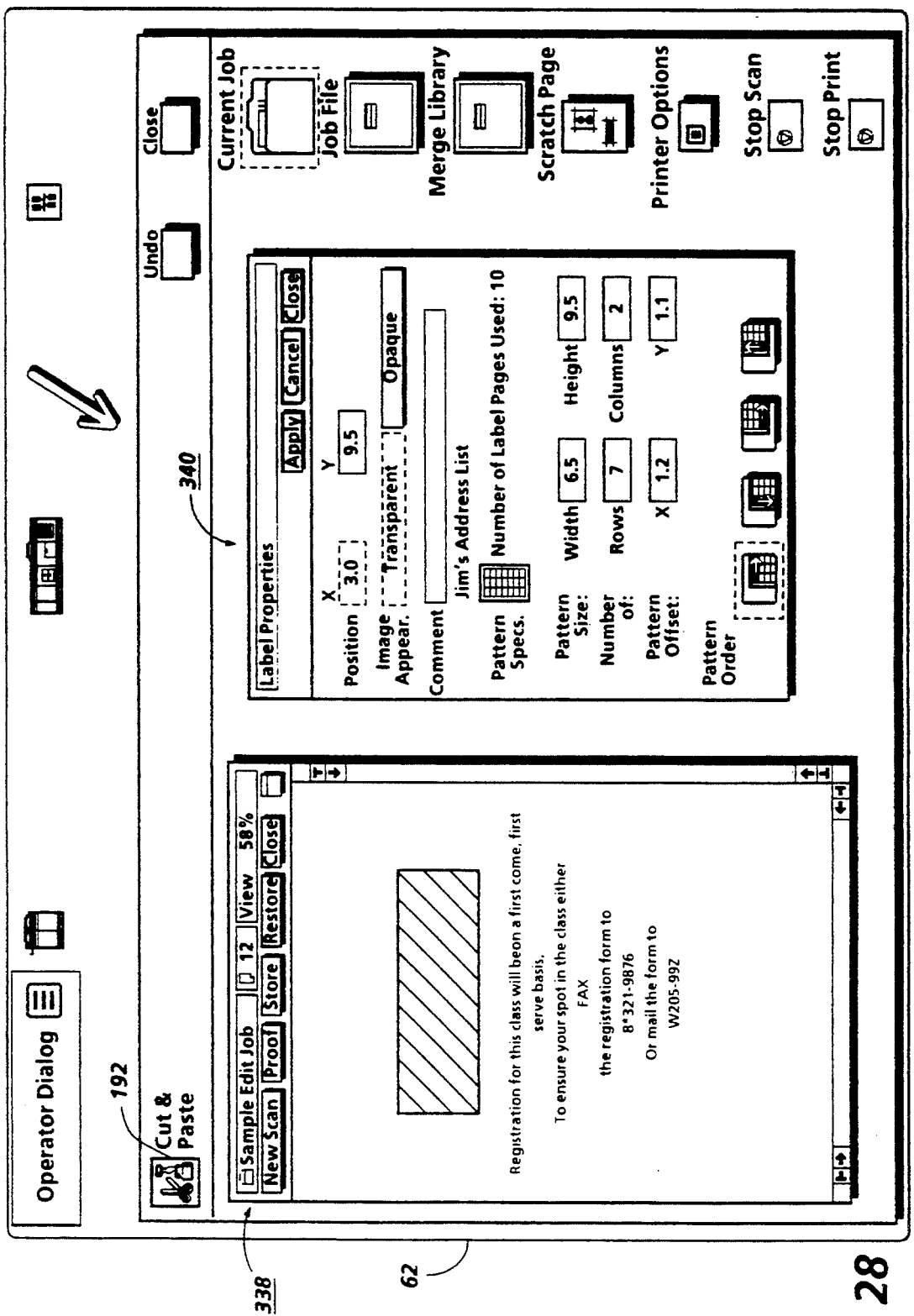

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

Figure 7:
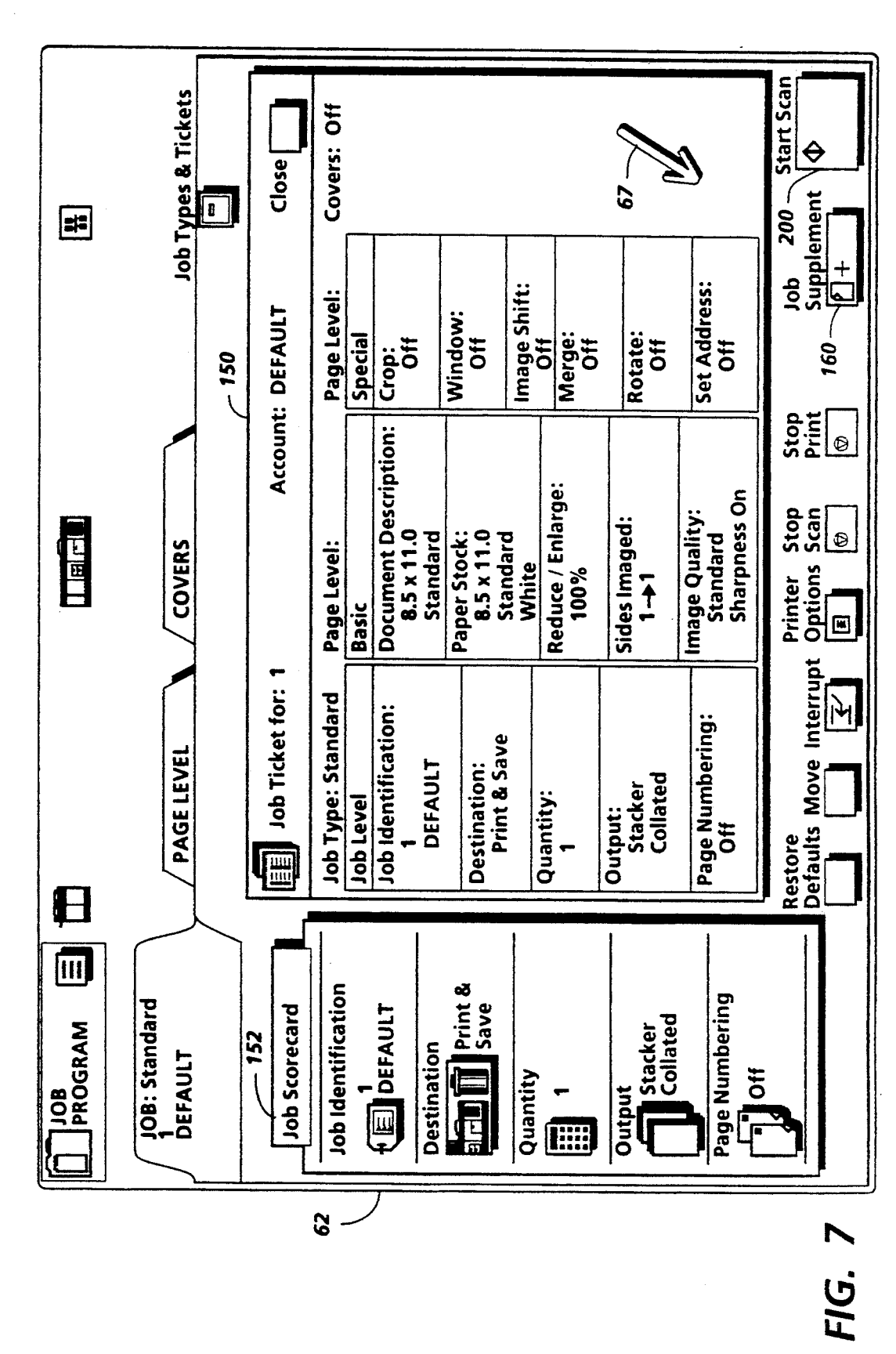

FIG. 7 is an elevational view depicting a Job Ticket with Job Scorecard for programming set addressing jobs as displayed on the User Interface (UI) screen of the printing system shown in FIG. 1;

FIG. 8 is an elevational view of the screen display depicting the programming selections for accessing the Set Addressing function of the present invention;

FIG. 9 is an elevational view of the screen display in which examples of addresses in a selected address subdirectory are displayed following opening of the subdirectory;

FIG. 10 is an elevational view of the screen display depicting the property sheet selections for an address subdirectory;

FIG. 11 is an elevational view of the screen display with the Property Sheet Properties selection highlighted;

FIG. 12 is an elevational view of the screen display depicting an example of the address properties following highlighting of the Properties selection;

FIG. 13 is an elevational view of the screen display with the Property Sheet Preview selection highlighted;

FIG. 14 is an elevational view of the screen display depicting an example of the address properties following highlighting of the Preview selection;

FIGS. 15A and 15B comprise a flow chart depicting the process for selecting an address file from the set address library;

FIG. 16 is an elevational view of the screen display depicting cut and paste programming features for creating addresses for an address subdirectory;

FIG. 17 is an elevational view of the screen display depicting the cut and paste selections;

FIG. 18 is a flow chart illustrating the creation of an address for creating addresses;

FIGS. 19–21 comprise a flow chart depicting a methodology for labeling selected pages in a print job;

FIG. 22 is an elevational view of a screen display in which a destination job is being selected from a job file in a job manager mode;

FIG. 23 is an elevational view of a screen display including a selector for designating job subsets upon which labels are to be applied;

FIG. 24 is an elevational view of a screen display in which a source job is shown as residing in the job file;

FIG. 25 is an elevational view of a screen display in which pages of a source job are shown as being specified;

FIG. 26 is an elevational view of a screen display including a window for adjusting the location of an electronic label on a print outline;

FIG. 27 is an elevational view of a screen display including a window for setting pattern specifications in the source job; and FIG. 28 is an elevational view of a screen display including a first window for displaying an electronic label on an electronic representation of a print outline and a second window for adjusting various properties associated with a destination job and a source job.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 2:
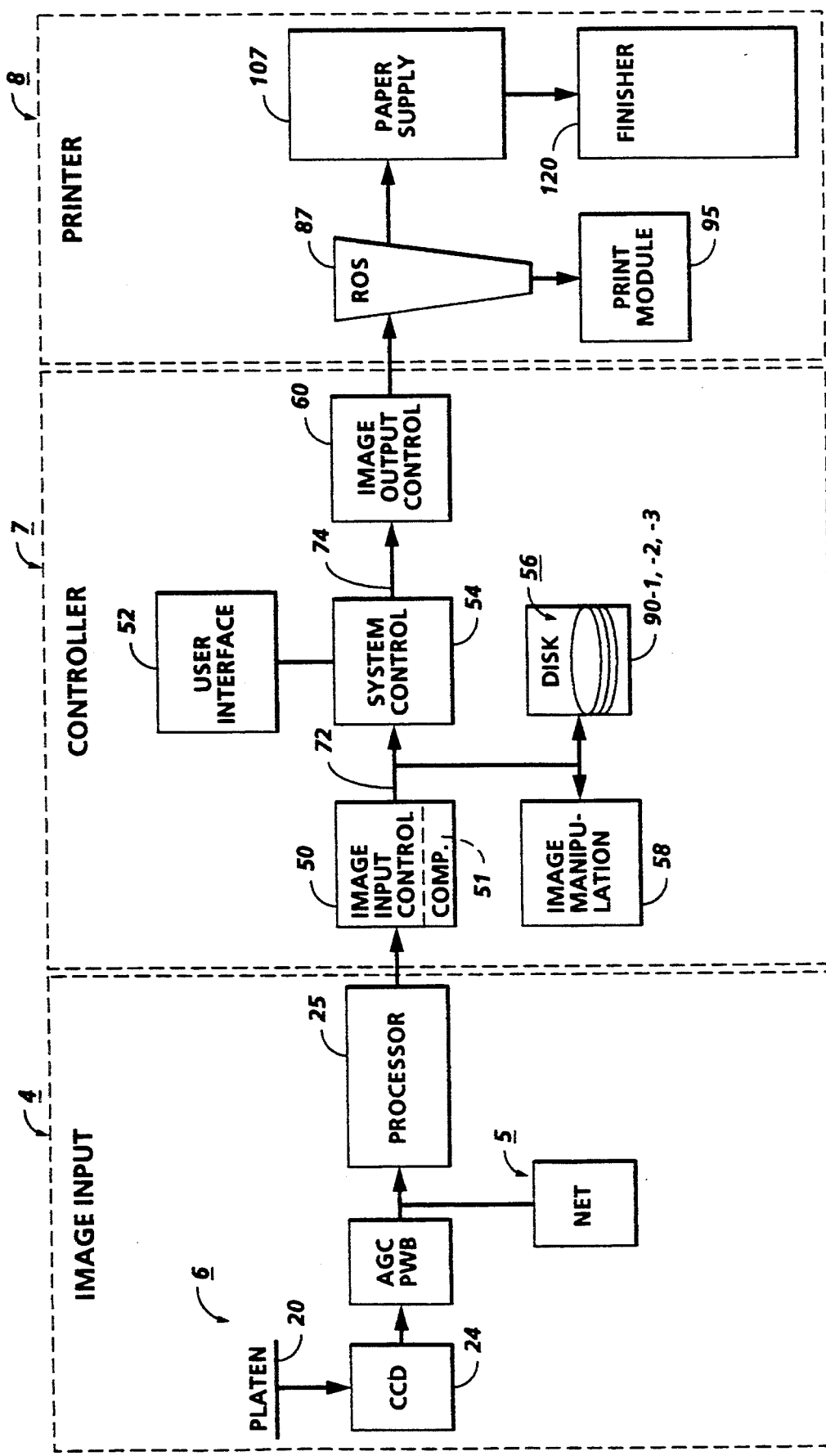
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
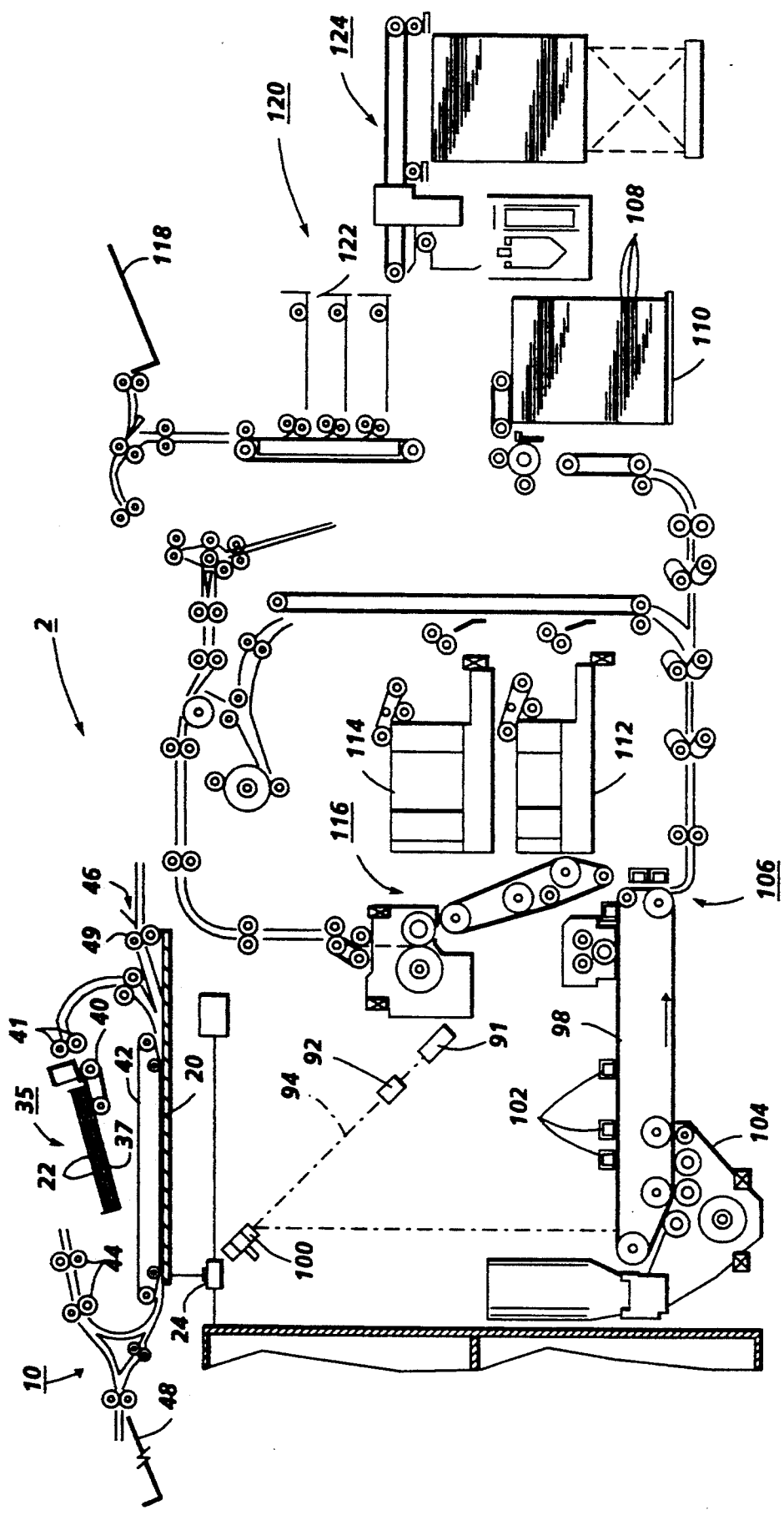
FIG. 3 is an elevational view illustrating the principal mechanical components of the printing system shown in FIG. 1.
Figure 4:
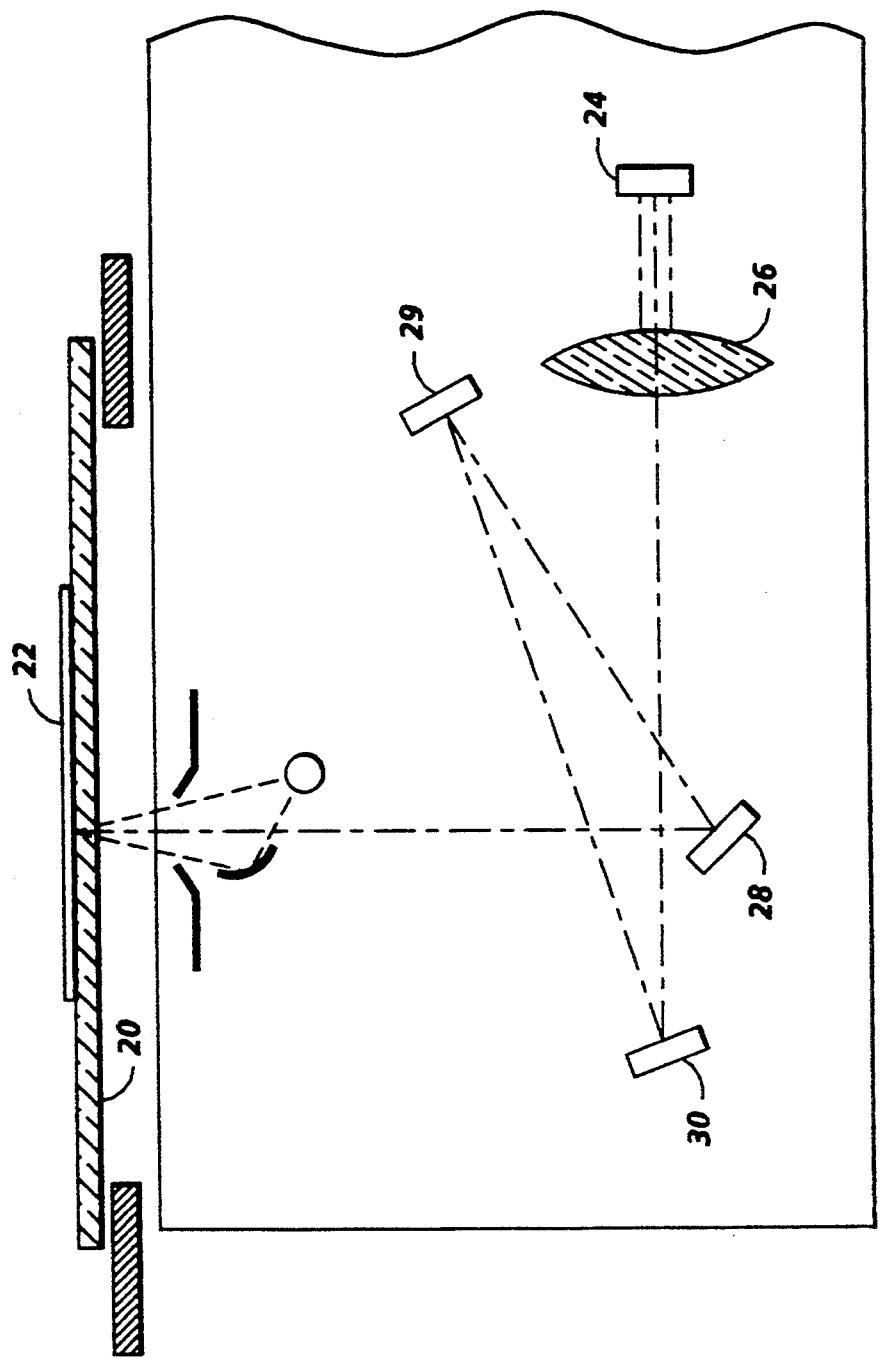
FIG. 4 is a schematic view showing certain construction details of the document scanner for the printing system shown in FIG. 1.

Referring particularly to FIGS. 2–4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (note shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 27 and mirrors 28, 29, 30 cooperate to focus array 24 on a line-like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which, in turn, advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a suitable print media, referred to as Paper Stock 108, delivered by Paper Supply section 107. Paper Stock 108 as will appear may comprise any of a variety of sheet sizes, types, and colors. For transfer, the Paper Stock is brought forward in timed registration with the developed image on photoreceptor 98 from either a main paper tray 110 or from auxiliary paper trays 112, or 114. The developed image transferred to the Paper Stock 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decorepressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A–5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with master and slave image manipulation processors 59, 59' respectively of image manipulation section 58; image generation processor PWBs 70-7, 70-8 with image generation processors 86 for processing the image data for printing by printer section 8; dispatch processor PVVB 70-9 having dispatch processors 88, 89 for controlling transmission of data to and from printer section 8; and boot control-arbitration-scheduler PWB 7010.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Items such as files and icons displayed on touchscreen 62 are described herein as being highlighted, actuated, opened, or selected by either touching the displayed item or pointing curser 67 at the item and keying mouse 66.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. Various Job Ticket types are provided, with access by means of Job Types and Tickets icon 157. In the example shown in FIG. 7, the Job Ticket for programming set addressing jobs is displayed.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

Referring to FIGS. 8 and 15 also, selecting SET ADDRESS on Job Ticket 150 in the "Special" programming level displays "Special" Scorecard 152 on touchscreen 12 with SET ADDRESS icon 164 opened. There is also displayed on touchscreen 62 a Set Address Library card file 170 together with Set Address Library icon 166. Actuating icon 166 displays, in numerical order, the address subdirectories 172 currently in the set address library. A print outline 174 with darkened area 175 to represent the relative size, orientation, and location of addresses 173 on the Paper Stock 108 currently programmed is also displayed on touchscreen 62 on one side of card file 170. Print outline 174 has a numerical scale along one side and the bottom to facilitate determination of the size, orientation and location of addresses 173 on the Paper Stock.

Referring to FIGS. 9 and 15, highlighting a subdirectory 172 displays the addresses 173 currently in the subdirectory. Descriptors identify the subdirectory 172 in which the address belongs, the number of the address in the directory, and the size of the addresses. Typically, addresses 173 comprise a name and street address (i.e., number, street, city, and Zip Code) of an individual or organization. The specific address, the total number of addresses in the subdirectory, the numerical order in which each address appears in the subdirectory addresses, and the order in which the addresses are arranged in a subdirectory are determined by the operator. Typically, the addresses comprise a customer mailing or distribution list.

Once the desired subdirectory 172 has been selected, SET ADDRESS icon 164 is closed to program the set addressing function. When the job being programmed is printed, the addresses 173 from the subdirectory are successively printed on the prints at the position selected, starting with the first address in the directory and ending with the last address in the directory. The minimum number N of prints or print sets is automatically programmed to equal the number of addresses N in the address subdirectory selected. Additional multiples or sets can be selected by means of the "Quantity" programming option on Job Ticket 150. Further, the operator can set the number of prints for a set to a specific address.

Other programming options include the ability to, in effect, divide the printed item such as a report to address portions to different addressees. For example, with a job/set, the operator can segregate the introduction of the report being printed from the main body of the report and distribute to different levels, i.e., an executive summary of the report can be addressed by one or more of the addresses in the directory with the full report addressed by the other addresses in the directory.

Referring again to FIG. 7, programming options for printing system 2 are preset to default selections as, for example, the default number of prints or sets is one (i.e., Quantity of "1"), the default size, type and color of the print media is, "8.5"×11", Standard, White Paper Stock, etc. Where programming options other than the default settings are desired, the corresponding one of the selections on Job Ticket 150 is highlighted. This displays the various choices from which programming selections may be made. Following selection of each programming change desired, the display returns to the Job Ticket level on closure of the programming icon for any further selection.

In cases where the operator is familiar with the contents of the subdirectory 172 to be used and desires to use all of the addresses in the subdirectory in the same order as the addresses currently appear in the directory, opening of the subdirectory may not be necessary. Alternately, the operator may print out the addresses from the selected subdirectory on the Paper Stock where a hard copy of the addresses is desired. Where the operator wishes to review, change, or edit the addresses, the directory is opened to display the addresses on touchscreen 12 as shown in FIG. 9. Since the number of addresses 150 in a subdirectory is typically more than can be displayed at one time on touchscreen 12, scrolling of the addresses is enabled by up and down scrolling icons 168, 169, respectively.

Where it is desired to skip or not use one or more of the addresses 173, the particular address or addresses are deactivated by highlighting the address or addresses and actuating erase icon 176. The deactivated address or addresses will not be deleted from the subdirectory but will be skipped during printing. The minimum number of prints or print sets will automatically be changed to equal the number of addresses that are to be printed.

The order in which the addresses 163 are presented in the address file may be changed. This may be done by highlighting a particular address, actuating MOVE icon 178, pointing cursor 67 to the place in the subdirectory where the address is to be moved to, and keying mouse 64.

Where it is desired to supplement the addresses from one subdirectory with the addresses from another subdirectory, the second subdirectory is selected in the manner described for selecting the first address. On closure of SET ADDRESS icon 164, the addresses in the second subdirectory will be accessed and printed following the printing of the last address in the first subdirectory.

Referring to FIGS. 10–12, where the operator desires to view and change the properties of an address in a subdirectory, the address is highlighted to display a property sheet 180 having Properties, Preview, and Close selections 181, 182, and 183, respectively. Selecting Properties 181 displays the properties of the addresses in the subdirectory. These include the owner, creation date, security restrictions, etc. together with the size and location of the address in numbers corresponding to the numerical scale shown in print outline 174. Concurrently, the size and position of the outline 175 on print 174 is showing the relative size and position that the address will appear on the print.

Selecting Preview 182 (FIGS. 13 and 14) displays further and somewhat more specific data about the address such as the side of the Paper Stock on which the address will be printed, the page in the print set on which the address will be printed, the current position and size of the addresses on the Paper Stock in inches, type of addresses, etc.

Referring to FIGS. 9 and 10, to enable the operator to change the size of the addresses in the subdirectory, or to change the position on the Paper Stock where the addresses will be printed, there is provided pairs of X direction and Y direction scrolling icons 184, 185 and 186, 187, respectively. By selective use of scrolling icons 184, and 185, the size of the addresses and/or the position of the addresses on the Paper Stock along the X axis may be changed. Similarly, by selective use of scrolling icons 186 and 187, the size of the addresses and/or the position of the addresses along the Y axis may be changed. Numerical displays 190, show the X and Y positions of the addresses.

Following changes to the address size, address location on the Paper Stock, the side and page on which the addresses are printed, etc. Close selection 183 is actuated to close property sheet 176. Subsequent closure of SET ADDRESS 164 icon programs the addresses from the selected subdirectory for printing with the job.

Referring to FIGS. 16–18, subdirectories 172 of addresses may be created in one of several ways. For example, documents having the addresses thereon may be scanned in using scanner section 6 in the appropriate mode. In this case, since the addresses are smaller in size than the area of platen 20 scanned, the scanned address image requires processing to remove extraneous images. It may also be desirable at that time to set other address properties, such as size, orientation, etc.

To program scanner section 6 so that only the address is scanned, a cut and paste routine is used. To enable cut and paste, cut and paste icon 192 displayed on touchscreen 62 is actuated. This displays a window 193 with various Edit Options available in this programming mode. An outline 194 ("Platen Raster Image") of the image area scanned is also displayed on touchscreen 62. NEW SCAN icon 204 is selected to cause scanner section 6 to scan the address bearing document on platen 20. Following initial scanning, the document is retained on platen 20 until the cut and paste process is completed as will appear.

By selecting "Crop" in the Edit Options shown in FIG. 17 are displayed on touchscreen 62. Selecting Crop and using left and right side scrolling icons 196, 197 on screen 62 and top and bottom scrolling icons 198, 199 allow the side, top, and bottom margins of the address image 173 to be set for cropping. The cropped areas are deleted leaving only the address image.

Following completion of cropping, other Edit Options may be selected such as REDUCE/ENLARGE which enables the size of the address image to be changed, ROTATE which enables the orientation of the address image to be changed, etc.

When the operator is satisfied with the address image, scanning is again actuated to cause scanner section 6 to rescan the address bearing document on platen 20. However, because of the scanner programming input provided in the aforedescribed cut and paste cropping routine, only the address portion of the document is scanned. Other changes programmed, i.e., REDUCE/ENLARGE, ROTATE, etc. are carried out by processor 25. The finished address is inserted into the address subdirectory 172.

Additional addresses may be similarly created by scanning addresses or lists of addresses on documents and, after processing, placing the addresses in the address subdirectory. When the last address is entered into the subdirectory, the directory is closed to store the subdirectory in the set Address Library.

Another source of addresses is a prepared address sheet containing mailing labels/addresses. An example of this is a '33-up' mailer sheet. The system can be programmed to crop a specific address location or by step and repeat, scan in each address individually and place the address in a stored sequential list. The above can be done in a single scan or in multiple scans.

Further, electronic addresses can be received from remote sources over network 5, or from streaming tape, etc. for inclusion in the system storage of addresses. Additionally, electronic addresses can be generated using keyboard 64.

For a second embodiment, labels (e.g. addresses) are printed on selected pages of a print job, rather than on every page of the print job. Referring to FIGS. 19–28, a technique, corresponding to the second embodiment, in which labels are printed on selected pages of a print job is discussed in detail. In the following explanation, it should be recognized that labels are part of a source job and the labels of the source job are printed on the pages of a destination job. Initially, at step 300 (FIGS. 19 and 22) a destination job is selected from a job file 302 while a job manager is in an Open Job submode. More specifically, as shown in FIG. 22, a selector 304 is positioned over a prospective destination job and the Open Job submode is activated with a fingertop or cursor. Operation of the job manager is discussed in U.S. Pat. No. 5,206,735 to Gauronski et al. ("'735 Patent"), the pertinent portions of which are incorporated herein. At step 306, the selected destination job, which preferably requires the printing of labels on a plurality of sets, is partitioned into one or more destination job sets. As will appear, the illustrated technique relates to a list driven approach in which the programmer need not indicate the number of sets to be printed. It will be appreciated by those skilled in the art, however, that the principles underlying the disclosed list-driven approach are equally applicable to a manual approach in which the programmer designates the number of sets to be printed.

The present explanation is accompanied throughout with an example (referred to as "current example") which serves to demonstrate some of the various features of the second embodiment. In the current example, the destination job is partitioned into a first set including pages 110 and a second set including pages 11–30. As explained in further detail below, due to the number of labels in the source job, 50 copies of the first set are printed and 20 copies of the second set are printed. In the current example, the 50 copies are "executive summaries" and the 20 copies of the second set are complete reports, each of which relate to the executive summary. It should be appreciated that the current example contemplates a situation in which 30 recipients will receive the executive summary only and 20 recipients will receive the executive summary in addition to a complete report.

Referring to FIGS. 19 and 23, at step 308, the programmer designates page(s), in the destination job sets, upon which labels are to be applied. The designation process is facilitated by use of a page selector 309, as shown in FIG. 23. The page selector is currently employed in the DocuTech® printing system and disclosed by the '735 Patent. In the current example, the page selector is used to designate that labels will be applied to pages 1, 12, 13, 18 and 25 of each printed set. Subsequent to designating pages in the destination job, one or more source jobs are selected (FIG. 24), per step 310, from the job file 302. In the illustrated embodiment of FIG. 25, a selector 312 of the type employed in the DocuTech® printing system, can be employed to select specific pages for application of labels to the destination job. It should be understood that the source job preferably includes one or more lists of labels, the labels, in one example, including a plurality of ordered addresses. As mentioned above, the labels may originate from, among other sources, a scan job or a network job and be ordered in a list or a matrix, the matrix, in one example, assuming the form of a 33-up mailer sheet. Further detail regarding the application of labels from the matrix to the source job is further discussed in copending U.S. patent application Ser. No. 08/226,739 (Attorney Docket No. 94093) entitled "Method of Applying Electronically Stored Labels from a Source Job to a Destination Job in a Printing System", to Strossman et al., filed Apr. 12, 1994, the pertinent portions of which are incorporated herein.

At step 314, the matrices/lists of the source job are preferably associated with respective sets of the selected destination job. In one example of the preferred technique, the matrices and/or lists of various jobs are used in the application of labels to the destination job sets developed in step 306. As indicated by steps 316, 318, each matrix or list can be, per step 318, mapped to one or more of these developed sets.

Referring to FIGS. 19 and 26, the position of each label as it is to be applied to a respective, selected destination job set page, is indicated in step 322. In the illustrated embodiment of FIG. 26, a template 324 is used to implement step 322 for a selected source job. For the contemplated embodiment, the template 324 can be used to assign label position on a page-by-page basis or on a job-wide basis. Accordingly, in the current example, label position can be adjusted for each of pages 1, 12, 13, 18 and 25 or any combination thereof. As shown in FIG. 26, the label to be applied is assigned a default position in a print outline 326, the default position being designated by the respective x, y coordinates 0.0 and 0.0. Through use of a fingertip or curser, the coordinates, and hence the position of the label, relative to the print outline 326, can be adjusted. It should be recognized that, in the current example, once the position of the labels are indicated for pages 1, 12, 13, 18 and 25, the labels will be printed at corresponding positions on the resulting copies of the sets. Furthermore, it should be recognized that the present technique contemplates a situation where it is desired to indicate multiple label positions on the same page so that multiple labels can be printed on the same set page. In the current example, two labels are to be printed on page 12. Finally, it should be recognized that a single label can be assigned to two different pages within the destination job, i.e. the same label, of a given matrix/list can be applied repeatedly. In the current example, the same label is applied to page 13 and 18. This sort of application is particularly appropriate for documents in which a particular reference, such as the name of a contest winner, is to be repeated throughout each destination job set.

Referring still to FIGS. 19 and 26, after indicating the position of the labels in the developed sets, label image appearance is set, via step 328, to designate whether a given label is to be opaque or transparent. This designation can be made on a label-by-label basis or on a job-wide basis. To understand why this step is useful, reference is made to copending FWC U.S. patent application Ser. No. 08/010,523 entitled "Process for Merging Merge Items with Prints Produced by Electronic Printing", filed by Hengst et al. on Jan. 27, 1993, the pertinent portions of which are incorporated herein. In particular, each label preferably comprises a bitmap or raster which merged onto an electronic page by superposing the bitmap, at a predesignated location, relative to the image information already on the electronic page. As will be appreciated by those skilled in the art, the background of the bitmap can be adjusted, in accordance with the opacity/transparency programming, to make the bitmap appear opaque or transparent relative to the image information on the electronic page.

As indicated above, the source job preferably comprises one or more matrices and/or one or more lists. As will be explained in further detail below, in printing the labels to the destination job, the labels are successively "picked off" a selected selected matrix or list (step 330) in a predetermined order. In order to pick off the label, the printing software needs to have a way of knowing the location of each label in memory. More particularly, each label occupies a certain amount of space and in order to read the label the printing software preferably scans the space for each label successively. As should be clear to those skilled in the art, there are many ways for defining the space occupied by each label. In one example, each label could be assigned to predefined locations (step 332) (FIG. 20) so that the printing software knows specifically where to go for finding each label. In another example, a matrix is used to define label location as discussed in the copending U.S. patent application Ser. No. 08/226,739 (Attorney Docket No. 94093). Referring specifically to step 334 and FIG. 27, a technique for setting up each matrix is referenced. This technique is discussed, with a reasonable degree of specificity, in U.S. patent application Ser. No. 08/226,739 (Attorney's Docket No. 94093).

Additionally, the order of printing the labels from the matrix(es) and/or list(s) can be altered. In one example, it may be desirable to print the labels of an originally provided list out of order so that the resulting printed items can be outputted in a selected order, such as alphabetical order. The process of positioning the labels in the source job can be facilitated by way of an editing step 336. An implementation of the editing step is discussed above. Referring to FIG. 28, a dialog, intended to facilitate the editing each label, is shown. As illustrated, the dialog includes a display 338, for depicting the label, and a property adjuster 340 for, among other things, altering the position of the label, relative to the display (and hence the resulting labeled print), and adjusting image appearance. While the label is shown as being an opaque box on the display 338, the label could be shown in terms of "What You See Is What You Get", i.e. as a WYSWYG item.

Once the destination and source job are set up, the matrices/lists are parsed (step 344) to determine if any conflicts exist between multiple lists used to apply the labels. In other words, the parsing is performed to determine if a correct number of labels has been supplied for purposes of labeling the destination job. As would be expected, one or more of the lists may include too few or too many labels. The types of conflicts that might arise can be best understood by the following variation of the current example: Assume that list 1, with 43 labels, is supplied for pages 12 and list 2, with 18 labels is supplied for page 25. Due to the specifications set for the print job, 40 labels are required to print two labels on 20 copies of page 12, while 20 labels are required to print a label on each copy of page 25. Accordingly, the technique would determine, at step 346, that a conflict exists and solicit any appropriate editing remedies at step 348.

In one form of conflict resolution, a conflict could be determined by taking the larger of the two list numbers (i.e. 43 in the variation of the current example) and dividing it by the smaller of the two list numbers (i.e. 18) and determining if the dividend is an integer. If the number is an integer then, in most cases, no conflict exists. If, on the hand, the dividend is not an integer, then a conflict can be declared with certainty. This technique of conflict resolution is applicable whether the number of set copies to be printed is set by the number of labels in the matrices/lists or manually by an operator.

As indicated at step 350, an editing remedy for a conflict could include removing and/or adding labels from the lists. Two remedies to the above situation would assume the form of deleting three labels from list 1 and adding two labels to list 2. As will be understood, in various settings, such as at a remote printing facility of a third party vendor, it is not always possible to determine what labels should be either added or deleted. Consequently, when no editing remedy can be taken, a blank is preferably printed in place of the unavailable label, and an error message is preferably issued when there is a surplus of labels in any given matrix/list.

To print labels on selected pages of each set, various print commands are preferably employed to designate whether a print is to be labeled and, if so, from where a given label is to be sourced. Referring to the current example, the following lists are provided: list 1 of 50 labels, list 2 of 40 labels, list 3 of 1 label and list 4 of 20 labels. While the following discussion only refers to sourcing labels from one or more lists, it is understood that the lists could assume various form, such as matrices. Generally, the 50 labels of list 1 are applied successively to the first page of each of the 50 copies of the first set (namely pages 1-10), the 40 labels are applied successively, two at a time, to the twelfth page of each of the 20 copies of the second set (namely pages 11-30), the label of list 3 is applied to the thirteenth and eighteenth pages of each of the 20 copies of the second set, and the 20 labels of list 4 are applied successively, to the twenty-fifth page of each of the 20 copies of the second set.

More particularly, in the preferred approach of printing pages 1-10, the first label of list 1 is printed, at a predesignated location, on page 1 of the first set copy while pages 2-10 are printed without labels. This process is repeated, successively accessing the next label on list 1, each time, until all 50 labels have been applied to the 50 copies of the first set. For pages 11-30, the first two labels in list 2 are sourced and printed, at predesignated locations, on page 12 while the same label is sourced from list 3 and printed on pages 13 and 18, at predesignated locations. Finally, the first label from list 4 is printed, at a predesignated location, on page 25, while pages 11, 14-17, 19-24 and 26-30 are printed without labels. This process is repeated, working successively through lists 2-4 until all of the labels are applied to the twenty copies of the second set, i.e. for each time a set copy is generated, the two next successive labels are applied from list 2, the same label is applied from list 3, the next successive label is applied from list 4 and pages 11, 14-17, 19-24 and 26-30 are printed without labels.

It will be recognized by those skilled in the art that the above procedure can be implemented quite readily with suitable code including a list of appropriate commands for fetching image data, relating to both the destination job and the source job (i.e. the lists), from memory, in a preselected order. Referring to FIG. 21, a flow chart, corresponding with an example of such suitable code, is discussed. The example of FIG. 21 assumes that the print job includes multiple sets and multiple lists; however, the concept underlying the exemplary approach of FIG. 21 applies with equal force to a print job having just one set and being printed from a single list. At step 354, the lists of the source job are merged in accordance with the order in which each label is to be applied to the destination job. For each label, a command is formulated for merging the label at a designated location on a destination job set page. The formulated commands are then placed in the command list in an order which corresponds to their eventual order of application. Additionally, commands for printing image data on both labeled and unlabeled pages are formulated and inserted into the command list at appropriate locations.

It will be appreciated by those skilled in the art, that the following command list contains portions which correspond with the printing of one or copies of each set. In the current example, for instance, the first portion of the command list would include commands for merging the 50 labels of list 1 successively on the first page of 50 copies of the first set and for printing the image data associated with the first set on pages 1–10 of the 50 copies of the first set.

Upon forming the command list, the first portion of the command list is, per step 356, selected. Referring to step 358, the image data is printed on the pages of the first set, and the labels associated with the first set are applied at predesignated locations on one or more selected pages of each copy of the set, in accordance with commands of the selected portion. Once labeling has been performed for the first set, it is determined, via step 360, whether copies of other sets are to be made. Assuming that further printing of other sets is required, the next portion of the command list associated with the next set is, per step 362, selected. Upon selecting the next portion, the printing step 358 is repeated. Once all of the sets have been printed, the process is complete. Considering the current example, in view of the discussion of steps 358, 360 and 362, once 50 copies of the first set is completed, pages 11–30 are printed in such a manner that the labels of lists 2, 3 and 4 are applied to designated pages of the second set at preindicated positions. It will be recognized that the commands of the command list are arranged in a manner that causes the labels of the lists to be applied successively to designated pages of the set copies in the selected order discussed above.

Numerous features of the above-disclosed second embodiment will be appreciated by those skilled in the art:

One feature of the disclosed second embodiment is that a methodology is provided for printing one or more labels on selected pages of one or more sets at predesignated locations. More particularly, in one example, a copy of a label is printed on multiple pages of the same set. In another example, copies of multiple labels are printed on the same page of a set.

Another feature of the disclosed second embodiment is that labels can be applied to one or more sets from multiple lists. For instance, multiple lists can be developed from one or more sources, such as a scanner or a network connection, and stored in memory. In turn, one or more labels from each list is applied to at least one list.

Yet another feature of the disclosed second embodiment is that, when lists are employed for labeling, a technique is provided for determining any conflict that might exist between the lists. In one example, a first list with m labels and a second list with n labels are provided. If the relationship between m and n does comply with a preselected relationship, e.g. m/n=an integer, then a conflict message is displayed.

What is claimed is:

1. A method of labeling a job in a printing system, comprising the steps of:
   partitioning the job into a first set with a plurality of electronic pages and a second set with a plurality of electronic pages;
   storing, in memory, a first electronic label and a second electronic label;
   displaying, on a display screen, a print outline with a selected identifiable area, the selected identifiable area being positionable on the print outline for representing a relative size, location and orientation of an area on a print upon which an electronic label is to be printed;
   indicating, on with the print outline, a first location at which a copy of the first electronic label is to be printed on a first selected print resulting from the printing of the plurality of electronic pages of the first set, and a second location at which a copy of the second electronic label is to be printed on a second selected print resulting from the printing of the plurality of electronic pages of the second set; and
   printing the first set, so that the copy of the first electronic label is printed on the first selected print at the first location, and the second set, so that the copy of the second electronic label is printed on the second selected print at the second location.

2. The method of claim 1, further comprising the steps of:
   storing a third electronic label in memory; and
   indicating, with the print outline, a third location at which a copy of the third electronic label is to be printed on a third selected print resulting from the printing of the plurality of electronic pages of the first set, wherein said printing step includes printing the first set so that the copy of the third electronic label is printed on a third selected print at the third location.

3. The method of claim 1, further comprising the steps of:
   storing a third electronic label in memory; and
   indicating, with the print outline, a third location at which a copy of the third electronic label is to be printed on the first selected print resulting from the printing of the plurality of electronic pages of the first set, wherein said printing step includes printing the first set so that the copy of the third electronic label is printed on the first selected print at the third location.

4. The method of claim 1, further comprising the step of storing a first list of electronic labels including the first electronic label and a second list of electronic labels including the second electronic label, wherein said printing step includes printing the first selected print with the first list of electronic labels and the second selected print with the second list of electronic labels.

5. The method of claim 4, further comprising the step of determining whether a selected relationship exists between a number of electronic labels in the first list and a number of electronic labels in the second list.

6. The method of claim 5, further comprising the step of providing a conflict message to an operator when the selected relationship does not exist.

7. The method of claim 6, further comprising the step of editing one of the first list and the second list in response to receiving the conflict message.

8. The method of claim 1, wherein said storing step includes providing the first electronic label and the second electronic label in the form of a first electronic address and a second electronic address, respectively.

9. The method of claim 1, wherein said printing step includes printing the first electronic label so that a portion of the first electronic label is either transparent or opaque relative to a print media upon which the first electronic label is printed.

* * * * *